(12) United States Patent
Lad et al.

(10) Patent No.: US 9,800,478 B2
(45) Date of Patent: *Oct. 24, 2017

(54) CROSS-LAYER TROUBLESHOOTING OF APPLICATION DELIVERY

(71) Applicant: ThousandEyes, Inc., San Francisco, CA (US)

(72) Inventors: Mohit V. Lad, San Francisco, CA (US); Ricardo V. Oliveira, San Francisco, CA (US); Michael Meisel, San Francisco, CA (US); Ryan Braud, San Francisco, CA (US)

(73) Assignee: ThousandEyes, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/194,398

(22) Filed: Jun. 27, 2016

(65) Prior Publication Data

US 2017/0005887 A1    Jan. 5, 2017

Related U.S. Application Data

(63) Continuation of application No. 14/210,131, filed on Mar. 13, 2014, now Pat. No. 9,411,787.

(60) Provisional application No. 61/793,283, filed on Mar. 15, 2013.

(51) Int. Cl.
| | |
|---|---|
| *H04L 12/24* | (2006.01) |
| *H04L 12/26* | (2006.01) |
| *H04L 12/723* | (2013.01) |
| *H04L 12/46* | (2006.01) |
| *H04L 29/08* | (2006.01) |

(52) U.S. Cl.
CPC ........ *H04L 43/045* (2013.01); *H04L 12/4633* (2013.01); *H04L 41/046* (2013.01); *H04L 43/50* (2013.01); *H04L 45/50* (2013.01); *H04L 67/02* (2013.01)

(58) Field of Classification Search
CPC ........ G06F 8/60; G06F 11/30; G06F 11/3089; G06F 11/34; G06F 11/3466; H04L 12/2602; H04L 43/00; H04L 41/12; H04L 43/045
See application file for complete search history.

(56) References Cited

U.S. PATENT DOCUMENTS

| | | |
|---|---|---|
| 8,254,273 B2 | 8/2012 | Kaminsky et al. |
| 8,484,374 B2 | 7/2013 | Zisapel et al. |
| 8,542,612 B1 | 9/2013 | Uttaro |
| 8,971,323 B2 | 3/2015 | Mithyantha et al. |
| 9,411,787 B1 * | 8/2016 | Lad ................ H04L 41/046 |
| 2002/0199016 A1 | 12/2002 | Freedman |
| 2005/0243729 A1 | 11/2005 | Jorgenson et al. |
| 2011/0145434 A1 | 6/2011 | Ringen |

* cited by examiner

*Primary Examiner* — Kevin C Harper
(74) *Attorney, Agent, or Firm* — Van Pelt, Yi & James LLP

(57) ABSTRACT

Techniques for cross-layer troubleshooting of application delivery are disclosed. In some embodiments, cross-layer troubleshooting of application delivery includes collecting test results from a plurality of distributed agents for a plurality of application delivery layers; and generating a graphical visualization of an application delivery state based on the test results for the plurality of application delivery layers (e.g., different application delivery layers).

29 Claims, 27 Drawing Sheets

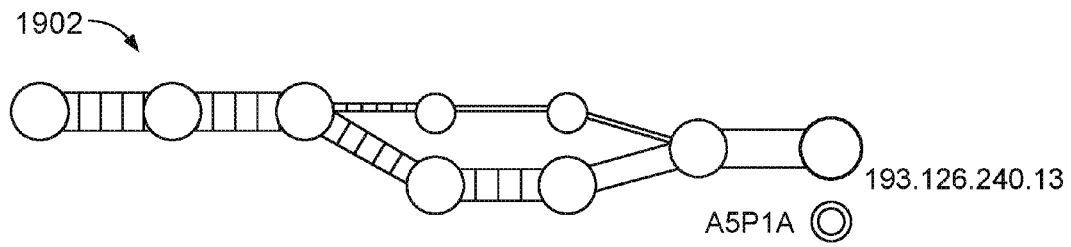
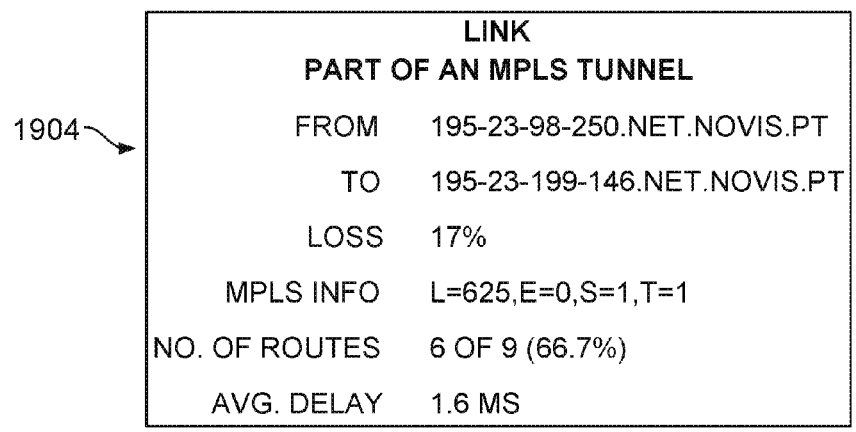
FIG. 19A
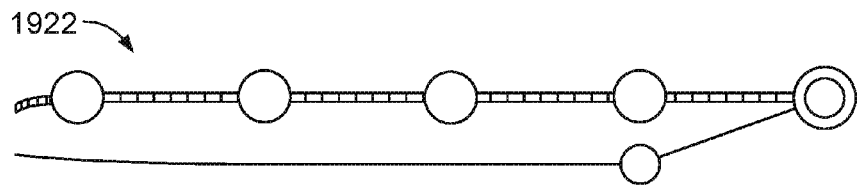
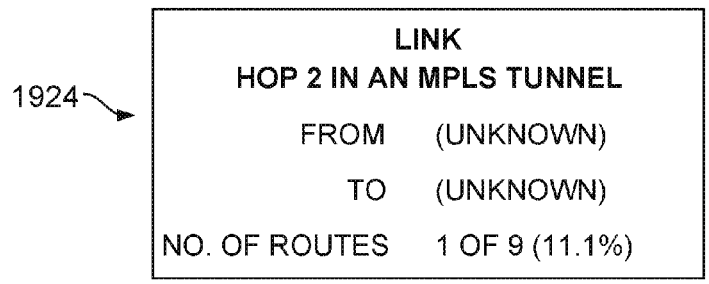
FIG. 19B

CROSS-LAYER TROUBLESHOOTING OF APPLICATION DELIVERY

CROSS REFERENCE TO OTHER APPLICATIONS

This application is a continuation of co-pending U.S. patent application Ser. No. 14/210,131, entitled CROSS-LAYER TROUBLESHOOTING OF APPLICATION DELIVERY, filed Mar. 13, 2014, which claims priority to U.S. Provisional Patent Application No. 61/793,283, entitled CROSS-LAYER TROUBLESHOOTING OF APPLICATION DELIVERY, filed Mar. 15, 2013, both of which are incorporated herein by reference for all purposes.

BACKGROUND OF THE INVENTION

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms on which the applications run. Various types of distributed applications can be provided as a software as a service (SaaS).

BRIEF DESCRIPTION OF THE DRAWINGS

Various embodiments of the invention are disclosed in the following detailed description and the accompanying drawings.

FIG. 19A illustrates a graph of a visualization of routing paths including a link that is indicated to be part of an explicit MPLS tunnel in accordance with some embodiments.

FIG. 19B illustrates a graph of a visualization of routing paths including a link that is indicated to be part of an implicit MPLS tunnel in accordance with some embodiments.

DETAILED DESCRIPTION

Figure 1:
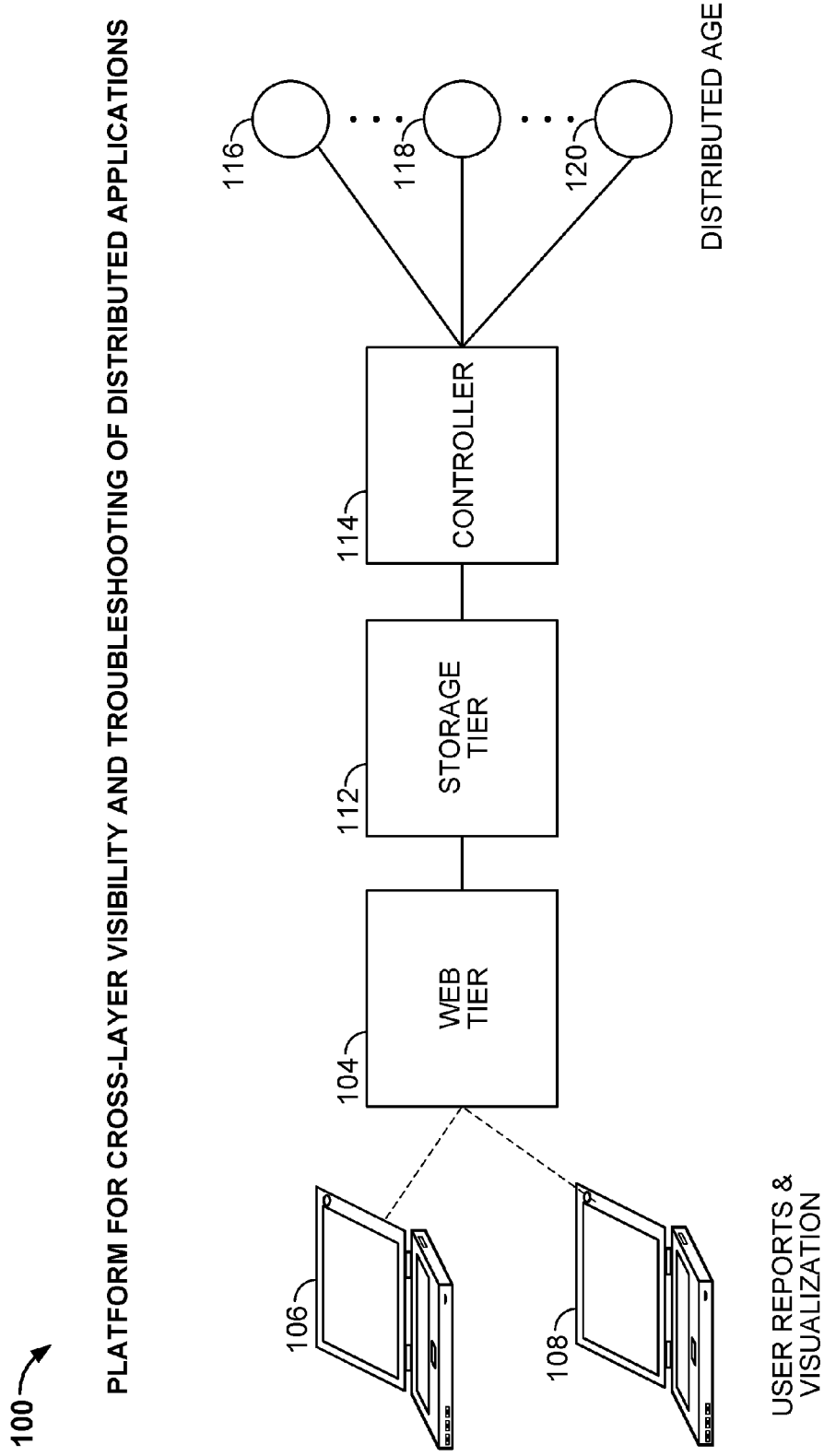
FIG. 1 illustrates a functional block diagram of a platform for cross-layer troubleshooting of application delivery in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task.

As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Cloud computing generally refers to the use of computing resources (e.g., hardware and software) that are delivered as a service over a network (e.g., typically, the Internet). Cloud computing includes using remote services to provide a user's data, software, and computation.

Distributed applications can generally be delivered using cloud computing techniques. For example, distributed applications can be provided using a cloud computing model, in which users are provided access to application software and databases over a network. The cloud providers generally manage the infrastructure and platforms on which the applications run. Various types of distributed applications can be provided as a software as a service (SaaS).

Users typically access cloud-based distributed applications (e.g., distributed applications) through a web browser, a light-weight desktop, and/or mobile application (e.g., mobile app) while the enterprise software and user's data are typically stored on servers at a remote location. Such cloud-based distributed applications can allow enterprises to get their applications up and running faster, with improved manageability and less maintenance, and can enable enterprise IT to more rapidly adjust resources to meet fluctuating and unpredictable business demand. Thus, distributed applications can allow a business to reduce Information Technology (IT) operational costs by outsourcing hardware and software maintenance and support to the cloud provider.

However, a significant drawback of distributed applications is that troubleshooting performance problems can be very challenging and time consuming. For example, determining whether performance problems are the result of the cloud provider of the distributed application, the customer's own internal IT network, a user's client device, and/or intermediate network providers between the user's client device and the cloud provider can present significant challenges.

What are needed are new techniques to visualize and troubleshoot the performance of distributed applications.

Accordingly, techniques for cross-layer troubleshooting of application delivery are disclosed. In some embodiments, various techniques are provided for cross-layer visualization and troubleshooting of application delivery, such as for performance problems associated with distributed applications. For example, a platform for identifying and/or determining performance problems associated with a distributed application(s) can be provided. As another example, the platform can generate reports that include various cross-layer visualizations that facilitate identifying and/or determining performance problems associated with a distributed application(s). As yet another example, various techniques described herein can be used to diagnose application deliver problems from cloud service providers, such as SaaS and/or other network delivered based applications (e.g., web sites, online stores, cloud based software, and/or other such network based applications and/or services) to determine the causes or sources of the application delivery performance issues or problems.

In some embodiments, cross-layer troubleshooting of application delivery includes collecting test results from a plurality of distributed agents for a plurality of application delivery layers; and generating a graphical visualization of an application delivery state based on the test results for the plurality of application delivery layers (e.g., different application delivery layers).

For example, the graphical visualization of the application delivery state can facilitate cross-layer troubleshooting of problems (e.g., associated with application delivery of a distributed application). As another example, the graphical visualization of the application delivery state can facilitate cross-layer visualization and troubleshooting of application delivery (e.g., associated with application delivery of a distributed application, which can identify and/or facilitate diagnosing of causes of application delivery problems).

In some embodiments, cross-layer troubleshooting of application delivery further includes outputting the graphical visualization of the application delivery state based on the test results for the plurality of application delivery layers.

In some embodiments, the graphical visualization of the application delivery state based on the test results for the plurality of application delivery layers facilitates cross-layer visualization and troubleshooting of problems (e.g., associated with application delivery of a distributed application).

In some embodiments, the graphical visualization of the application delivery state based on the test results for the plurality of application delivery layers facilitates cross-layer troubleshooting of application delivery by providing for correlation of the test results across a plurality of layers (e.g., application delivery layers).

In some embodiments, the graphical visualization of the application delivery state based on the test results for the plurality of layers facilitates cross-layer troubleshooting of application delivery by providing for correlation of the test results across a plurality of layers using a space domain and/or a time domain.

In some embodiments, the plurality of distributed agents are controlled by an agent controller. In some embodiments, the graphical visualization of network performance is generated by a platform for cross-layer visibility and troubleshooting of distributed applications 100, such as shown in FIG. 1. In some embodiments, the network performance test results from the plurality of distributed agents for the plurality of layers are stored in a storage tier (e.g., which can include a database or another type of data store).

Overview of Techniques for Cross-Layer Visibility and Troubleshooting of Distributed Applications In some embodiments, cross-layer visibility and troubleshooting of distributed applications includes using software agents to collect information from different points in a network across different layers in the application delivery (e.g., of a distributed application), as further described herein with respect to various embodiments. For example, such information can be collected and aggregated by centralized collectors and aggregators and presented to a user as a Software as a Service (SaaS). In some embodiments, different layers are correlated using one or more of the following: a monitored object, time, and location.

In some embodiments, various techniques described herein allow users to drill down to identify problems and locations whether at different layers (e.g., a network, transport, and/or application layer) to correlate across application delivery layers to determine whether, for example, network issues are affecting the performance of a distributed application(s), as further described herein with respect to various embodiments. For example, such techniques can be applied to both internal network diagnostics (e.g., for an organization's internal network) and/or external network diagnostics (e.g., for a web site accessed across the Internet, such as for a cloud-based distributed application).

In some embodiments, various techniques described herein allow for determination of a network topology to indicate, for example, anycast routing issues used by DNS providers (e.g., such as when there are multiple DNS servers sharing the same IP address) as well as structure and/or activity of a network topology, as further described herein with respect to various embodiments. For example, such techniques can be applied to both internal network diagnostics (e.g., for an organization's internal network) and/or external network diagnostics (e.g., for a web site accessed across the Internet, such as for a cloud-based distributed application).

In some embodiments, various techniques described herein allow for diagnosing SaaS applications, such as for cloud-based distributed applications, using, for example, a lightweight agent, as further described herein with respect to various embodiments.

A Distributed Testing Framework

In some embodiments, cross-layer visibility and troubleshooting of distributed applications includes a distributed framework to distribute tests across different agents in the Internet. For example, agents can be executed on hosted providers using cloud computing distributed across multiple ISPs, which are controlled by agent controllers to perform one or more tests as further described herein, in which the test results can be collected for correlation and analysis, as further described herein with respect to various embodiments. In some embodiments, agents are computing resources that are controlled, and, for example, can be either virtual or dedicated servers. Agents can be distributed across different geographies and networks, for example, distributed agents can be distributed to mostly Tier-1 and Tier-2 networks to avoid the noise of bad connectivity of last mile connections.

An example of a system architecture for providing cross-layer visibility and troubleshooting of distributed applications is shown in FIG. 1 as described below.

FIG. 1 illustrates a functional block diagram of a platform for cross-layer troubleshooting of application delivery in accordance with some embodiments. In particular, FIG. 1 illustrates an environment in which a platform for cross-layer visibility and troubleshooting of distributed applications 100 includes distributed agents 116-120 (e.g., which can be distributed across various geographies and/or devices for performing different types of tests and/or targeting different sites, locations, and/or metrics) that collect data based on configured tests, and the distributed agents 116-120 send this data to a controller(s) 114 (e.g., agent controllers). The controller 114 stores the data in a storage tier 112 (e.g., providing permanent storage) that can be used by a web tier 104 to generate visualizations and reports to users accessing the platform 100 using client devices (e.g., computers, laptops, smartphones, and/or various other computing devices).

For example, a report can be output to a user to present the collected and analyzed cross-layer application delivery information of a distributed application. Example reports can include various visualizations and/or diagnostic information as further described herein with respect to various embodiments. For example, the report can facilitate troubleshooting application delivery associated with the distributed application to determine whether performance problems are the result of the cloud provider of the distributed application, the customer's own internal IT network, a user's client device, and/or intermediate network providers between the user's client device and the cloud provider. The report can also include recommendations to the user to resolve any such determined application delivery problems associated with the distributed application. In some cases, the report can also be provided to a third party, such as the SaaS provider of the distributed application and/or a network provider, which can be provided as information to indicate the source of such determined application delivery problems associated with the distributed application.

In the example shown, the user of client device 106 (hereinafter referred to as "Bob") is employed as an IT manager of a distributed application company ("SaaS Company"). The user of client device 108 (hereinafter referred to as "Alice") is employed as an IT manager of a national company ("ACME Company"). As will be described in more detail below, Bob and Alice can each access the services of platform 100 (e.g., platform for cross-layer visibility and troubleshooting of distributed applications) via web tier 104 over a network, such as the Internet. The techniques described herein can work with a variety of client devices 106-108 including, but not limited to personal computers, tablet computers, smartphones, and/or other computing devices.

In some embodiments, platform 100 generates various reports based on results of the network performance tests to facilitate cross-layer visibility and troubleshooting of application delivery associated with a distributed application(s), as further described herein. In some embodiments, platform 100 includes a data store, such as storage tier 112 for storing results of the network performance tests and/or the reports.

In some embodiments, a set of agent controllers 114 is provided as shown to send various tests (e.g., such as the various test described herein with respect to various embodiments) to the distributed agents for execution by the distributed agents. For example, agents can be executed on hosted providers using cloud computing distributed across multiple ISPs, which are controlled by agent controllers to perform one or more tests as further described herein, in which the test results can be collected for correlation and analysis, as further described herein with respect to various embodiments.

In some embodiments, the tests are configured through a web interface by a user. For example, typical parameters can include the frequency of various tests, the target of the tests, and the agents (e.g., or locations) where the tests are to be performed. The test parameters can be sent from the controller (e.g., agent controllers 114) to the distributed agents after an agent checks-in (e.g., using a pull mechanism). After an agent executes a test, the agent can export the test result(s) back to the controller. The controller can then provide the results back to a data store (e.g., storage tier 112) for permanent storage (e.g., or temporary storage). Besides periodic tests, a controller can also send on-demand tests to an agent(s) through, for example, a Remote Procedure Call (RPC) call for immediate or on-demand execution.

In various embodiments, platform 100 is a scalable, elastic architecture and may comprise several distributed components, including components provided by one or more third parties. Further, when platform 100 is referred to as performing a task, such as storing data or processing data, it is to be understood that a sub-component or multiple sub-components of platform 100 (whether individually or in cooperation with third party components) may cooperate to perform that task.

In some embodiments, tests include various types of tests to facilitate cross-layer visibility and troubleshooting of application delivery associated with a distributed application(s), as further described herein. Example network tests include data path measurement tests, routing path measurement tests, and end-to-end network metrics tests. Example DNS tests include per name server testing and Domain Name System Security Extensions (DNSSEC) bottom-up validation tests. Example HTTP tests include testing of steps of a Uniform Resource Locator (URL) fetch. Example page load tests include testing of a load of an entire web page using a web browser (e.g., a typical web browser). Example transaction tests include performing a multi-step scripted transaction from a web browser (e.g., a typical web browser). These and various other tests are discussed in greater detail below.

Cross-Layer Correlation

In the next sections, various techniques for allowing users (e.g., Bob and Alice) to easily navigate between different layers of data are described in accordance with some embodiments. For example, platform 100 can provide users with a natural flow of action for root cause identification of problems as further described herein with respect to various embodiments.

Slicing Data Across Time—Rounds and Timeline

In some embodiments, tests aggregate data over certain time intervals (e.g., small time intervals), referred to as rounds. In some embodiments, a round includes one sample of data from each agent (e.g., each agent can be placed in a different geographical location) for a given test. In some embodiments, data over each round is aggregated for a set of agents (e.g., all the agents) and, for example, can be shown on a timeline. In some embodiments, a timeline is implemented as a navigation widget that enables users to see the aggregate behavior of all of the agents over time (e.g., or just an individual agent) and to click on a specific point in time for a detailed drill down (e.g., to view specific cross-layer network test related data at a specified time or time window/interval). For example, a user can be provided with several metrics to choose from, and a timeline can be associated with one or more metrics.

Compound Tests

In some embodiments, some tests are composed of multiple subtests that are run at the same time. For example, the subtests can each be different and associated with different layers of visibility. Performing different active tests at the same time for different layers allows for switching between subtests while keeping the same test and round (e.g., and eventually the same agent location). For instance, a test can include an HTTP subtest and a network subtest at the same time. Then the user can navigate from HTTP metrics, to end-to-end network metrics, all the way down to individual router hop metrics (e.g., by inspecting the data path). For example, this can be useful to identify/classify problems that are network induced versus problems that are back-end related.

Correlating Different Layers

In some embodiments, when switching between views (e.g., or layers), the context is maintained, such as the following: (1) the test, (2) the round, and (3) the location (e.g., the agent ID or the agent location). More formally, each layer L0 has an associated vector of features, referred to as the context vector, $C_{L0}$, that includes all dimensions that uniquely identify a view in layer L0. When moving between layer L0 and L1, a function is applied to $C_{L0}$ to provide $C_{L1}$, such as for example, the following:

$$C_{L1} = F_{L0 \to L1}(C_{L0}).$$

We can think of F as a matrix of functions, and the indexes are the current layer, and the next layer the function is mapping to.

In some embodiments, a Graphical User Interface (GUI) is provided that can allow a user (e.g., Bob or Alice) to navigate between different layers, such as to jump to different application delivery layers (e.g., path visualization, BGP metrics, BGP route visualization, etc.) and web layers (e.g., basic HTTP, etc.). In some embodiments, a set of layers are correlated, and reports including visualizations that present results of test performed at the different correlated layers can be accessed, such as using hyperlinks in a GUI menu that can encode the context vectors as GET parameters in the URLs. For example, users can jump to Path Visualization, BGP Metrics, BGP Route Visualization, and Basic HTTP views while maintaining the context as discussed above.

Table 1 (below) shows a transition table between different layers, indicating from which layers (rows) is it possible to jump to (columns) in accordance with some embodiments.

TABLE 1

Transitions between layers, * indicates transition is only available for compound tests.

| | TO | | | | | |
|---|---|---|---|---|---|---|
| FROM | Net: End-to-end | Net: Path Viz | BGP | DNS: Server Metrics | Basic HTTP | Page Load |
| Net: End-to-end | — | Yes | Yes | Yes* | Yes* | — |
| Net: Path Viz | Yes | — | Yes | Yes* | Yes* | — |
| BGP | Yes | Yes | — | Yes* | Yes* | — |
| DNS: Server Metrics | Yes* | Yes* | Yes* | — | — | — |
| Basic HTTP | Yes* | Yes* | Yes* | — | — | Yes* |
| Page Load | — | — | — | — | Yes* | — |

Application Delivery Layers

The next sections describe the layers involved in application delivery and how data is collected and analyzed at each step in accordance with some embodiments.

Network Performance

Measuring Network Performance

In some embodiments, an approach for measuring response time of network level metrics from a network server is provided using a train of TCP SYN packets (synchronise packets in transmission control protocol). For example, providing such a train of TCP SYN packets appears to the network server to be like any normal connection that the network server will normally respond to; and while the network server may throttle such connections, even if throttling occurs, that would still generally provide an accurate reflection of a typical user connection response time as that network server is throttling for other such user connections as well.

In some embodiments, another approach for measuring response time of network level metrics from a network server is provided using a TCP piggy-backed technique, which can be used if the network server supports the SACK (Selective Acknowledgements) option for TCP or other similar protocol options for TCP. For example, the client can open a hole of 1-byte in the sequence space and keep advancing the TCP sequence numbers by 1-byte each time, in which case the server replies with a respective SACK set. This approach makes it possible to use TCP in a controlled query-response mode without sending data to the application layer on the server side.

Other approaches for measuring response time of network level metrics from a network server can include using ping/Internet Control Message Protocol (ICMP) techniques, but some servers and/or Internet Service Providers (ISPs) (e.g., gateways/firewalls) often block such ICMP traffic.

In some embodiments, in order to measure end-to-end network properties, active measurements from agents (e.g., distributed agents) to destination servers are performed. For example, servers can be identified by host name (or IP address) and TCP port number. Periodically, a train of N TCP SYN packets is sent to each server from each agent. A full TCP connection is not established, because the client sends a TCP RST (TCP reset) right after receiving the SYN ACK response from the server. These N points allow for measuring, for example, the following: (1) packet loss (e.g., ratio of sent packets that were ACKed), (2) average network delay (e.g., time between SYN and ACK), and (3) network jitter (e.g., average delta between consecutive delays).

Visualizing Network Performance

Figure 2:
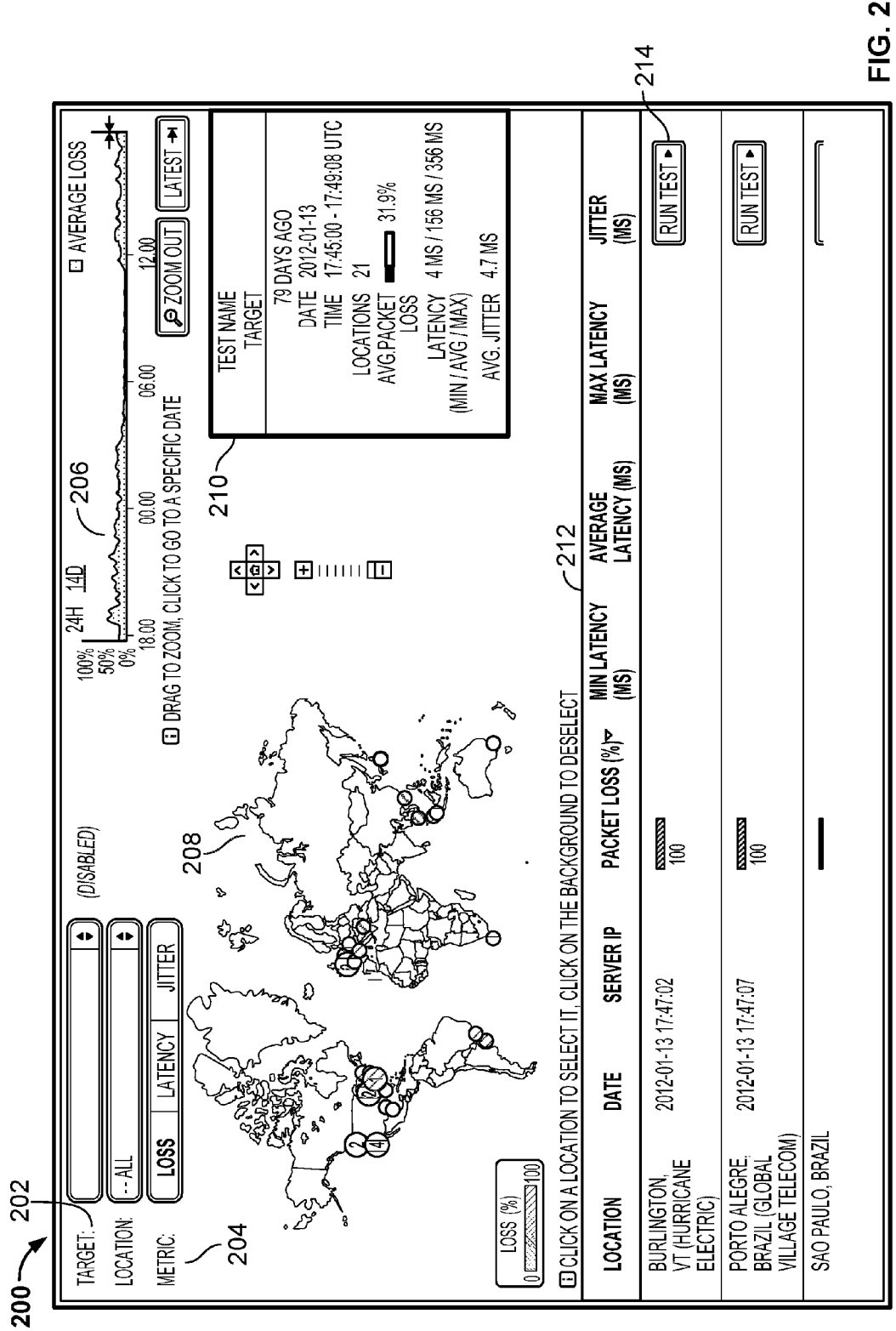
FIG. 2 illustrates a network performance visualization in accordance with some embodiments.

FIG. 2 illustrates a network performance visualization in accordance with some embodiments. In particular, FIG. 2 is a screen shot 200 of a GUI presented via an interface (e.g., using platform 100) that provides a visualization of a network performance using various techniques described herein. As shown at 202, users can select the target (e.g., server) that they want to look at, such as shown in this example, www.example.com, port 443 (SSL). As shown at 204, there is also an option to select the network metric, such as shown, in this example; "loss" (or packet loss) is selected.

As shown at 206, a timeline is provided that shows the time-series of the metric. In some embodiments, as described further below, the timeline allows a user to select an instant in or interval of time to drill down to (e.g., interactive timeline that allows users to select a specified time or time interval for drill down for further analysis, such as to look at a window of time of high packet loss to try to determine root cause(s) of such high packet loss).

As shown at 208, a world map depicts the locations of the distributed agents as well as a visual indication of their status according to the selected metric 204. In this example, the red dots (e.g., shown as completely shaded circles or another graphical indicator to differentiate these icons) are agents that are experiencing heavy packet loss, and the green dots (e.g., shown as completely partially shaded or hashed circles or another graphical indicator to differentiate these icons) are agents without packet loss.

A summary box 210 provides a concise report of the metrics. A table 212 shows a more detailed breakdown of the metrics as measured by each agent. For example, the table can be sorted by any column to facilitate the analysis of the data. On the right end of each row, a "Run Test" button 214 is provided that allows users to run on-demand tests to the target (e.g., target server). For example, this can be useful to verify if a problem reported by an automated test is still occurring.

Data Paths

Measuring Data Paths

Traceroute is generally a computer network diagnostic tool for displaying the route (path) and measuring transit delays of packets across an Internet Protocol (IP) network. While a traceroute diagnostic using ICMP packets can be used to measure data paths, such an approach may not be effective on some networks as many ISPs block ICMP packets. Accordingly, in some embodiments, in order to collect data paths, Time To Live (TTL) limited TCP SYN packets are sent to a specific destination server. Routers reply with a TTL Time Exceeded message every time they receive a packet with TTL=1 (e.g., set counter to 1, which is decremented to 0 in IPv4 by routers each time they are processed by router; add one to the TTL to keep extending the path an extra hop; repeat 3 times for destination to map out path, as shown in the below pseudo code sample). Thus, probes are sent with increasing TTL to collect the source IP addresses of the ICMP packets to reconstruct the path packets are taking. In some cases, special precaution can be taken to avoid issues with load balancing. In the case of TCP, if the same 5 tuple (e.g., source IP, destination IP, source port, destination port, and protocol) is kept between probes, balancers will send packets in that flow through the same interfaces.

As shown below in Algorithm 1, a sample pseudo code scheme is provided in accordance with some embodiments for measuring data paths using TCP SYN packets as discussed above.

Algorithm 1: Data path measurements.

```
MAX_ROUNDS=3;
For vRound=1 to MAX_ROUNDS
    For vTTL=1 to 255
        vReply = SendTCPPacket(vTTL,vDestination,vSourcePort,vDestPort);
        If vReply!=null
            push(vHops[vRound],vReply);
        End If
    End For
    //distinguishing nodes with losses from non-responding nodes
    If vDestination not in vReply
        Mark last responding node as lossy
    End If
End For
```

Because the final hop is a TCP server, we should always expect a TCP SYN ACK packet back from the server. If that does not happen, then it either means that the server is not reachable at layer 3 or that the application stopped at the server. Note that some hops in the path might not send ICMP TTL Exceeded messages, so the server SYN ACK is used as a reference. If there are non-responsive hops after a certain point on the way to the server and if the destination server replies with a TCP SYN ACK, then we assume that those hops do not send ICMP TTL Exceeded (so there is no packet loss). On the other hand, if a SYN ACK is not received from the server, and we have non-responsive hops after hop X in the path, then we assume X is one hop way from the point where packets are being dropped—that is, the last known good hop in the data path.

Below is an example illustrating hops in a data path and whether or not a response is received on such hops on a path between a start (e.g., a Source Node) and a Destination Node.

START→[IP-1-responsive]→[no response]→ . . . →[no response]→[Destination Node]

In this example, if we do not receive a response from the Destination Node, then in this case we would identify the hop at IP-1, which did respond (the last known good hop) as the path termination point.

Visualization of Data Paths

In some embodiments, various techniques for visualization of data paths are provided. In some embodiments, data delivery is represented in the network in a per-hop model in which each hop represents an interface of a physical router. In some embodiments, a graph of a data path visualization of a data path to a destination site (e.g., a destination, such as port 443 (SSL) of www.example.com, or some other destination) is provided, such as shown in FIG. 3 as discussed below.

Figure 3:
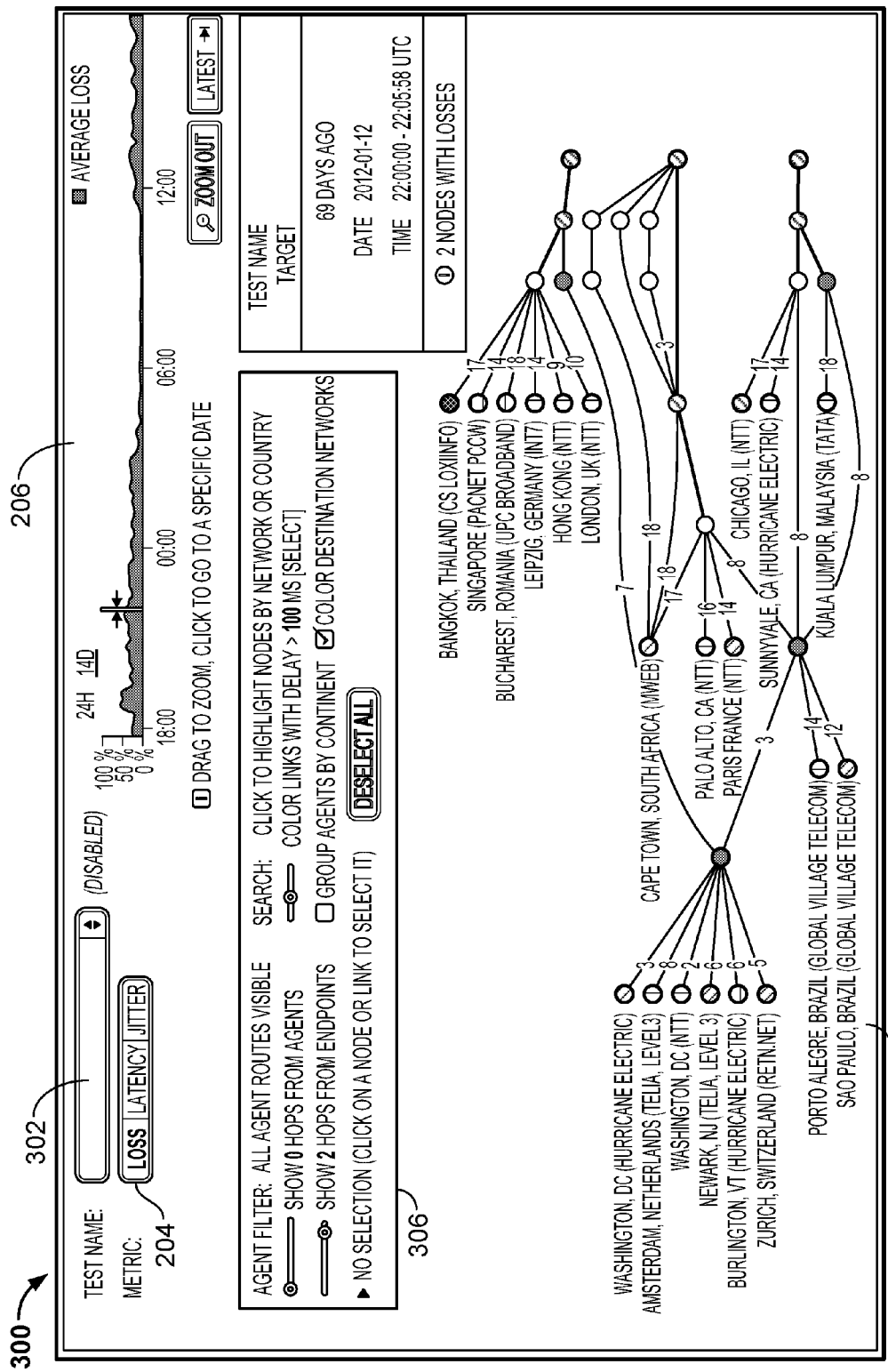
FIG. 3 illustrates a graph of a visualization of a data path to a destination site in accordance with some embodiments.

FIG. 3 illustrates a graph of a visualization of a data path to a destination site in accordance with some embodiments. In particular, FIG. 3 is a screen shot 300 of a GUI presented via an interface (e.g., using platform 100) that provides a visualization of a network performance using various techniques described herein. As shown at 302, users can select the test name (e.g., test to be performed by distributed agents). As shown at 204, there is also an option to select the network metric, such as shown, in this example; "loss" (or packet loss) is selected. As shown at 306, various agent filters (e.g., configurations or settings) can be set for the agents. Based on the test results received from the distributed agents for the selected test(s) and agent filter input, a graph 308 is presented to provide a data path visualization of a data path to a destination site in accordance with some embodiments.

In some embodiments, each path of the graph starts with an agent node in the left side that is shown with icon indicators (e.g., shown as colored circles, completely shaded circles, or another graphical indicator to differentiate these icons) according to each agent's results or status relative to the selected metric, in this case, packet loss. For example, nodes with a red outline can represent points in the network dropping packets. In particular, such nodes can indicate the last responsive hops in the path, such that the packet loss is indicated to most likely be happening in the immediate hop. As another example of screen visualization of a data path to a destination site, even if view of visualization of data paths is selected to show zero hops using agent filter 306, the data path visualization can still display hops with packet loss to illustrate potential problematic hops (e.g., regardless of the number of hops to be shown, all bad nodes with losses can be presented in the visualization graph 308).

For example, the network delay between consecutive hops can also be determined (e.g., approximated or estimated) using this technique. As shown as agent filter 306, a control "Color links with delay>x ms" is provided that can provide an icon indicator (shown as colored circles such as red circles, completely shaded circles, or another graphical indicator to differentiate these icons) for links that have more than a selected number of milliseconds (ms) (e.g., 100 ms as shown). The threshold of link delay can be dynamically changed using agent filter 306, which then automatically updates the data path visualization accordingly.

In some embodiments, a hop expansion control of agent filter 306 allows the topology to be expanded any number of hops from any side (e.g., agent or server) of the topology. For example, this can provide a useful agent filter control from the server side, because that is typically a customer actionable zone. As shown in graph 308, the links with a number on top are aggregation links that are expanded as the number of hops in the filter increases or just by clicking in the number.

In some embodiments, another useful feature is the ability to select nodes and links in the topology shown in graph 308. For example, selected nodes and links can be inserted into a selection box, and their position in the topology can be tracked over time by clicking in different points in the timeline. In this manner, routing changes can be tracked over time. In some embodiments, double clicking in a specific node selects all nodes and links belonging to routes going through that node, making it easier to track entire routes over time.

In some embodiments, the metric selection, as shown at 204, affects timeline 206 and the agent node status indicators (e.g., coloring of the agent icons or some other icon indicator) in the graph 308. For example, the users can select from one of three end-to-end metrics, such as packet loss, latency, and jitter. In some embodiments, the values of these metrics are computed from a train of n TCP SYN packets sent to the destination about the same time the data path measurements take place to preserve time correlation between the end-to-end effect and the per-hop effect. As an example, if agent x is experiencing a very high end-to-end latency to reach the destination, such very high end-to-end latency to reach the destination can be displayed with a color red (e.g., coloring of the agent icons or some other icon indicator) in the graph 308, and by looking at the breakdown per hop, where the bottleneck is located can be determined.

For example, the visualization layout (e.g., using a version of the Sugiyama's algorithm or another algorithm) can display a graph hop by hop and minimize the link crossings between nodes, making the graph more readable.

Case Studies

Figure 4A:
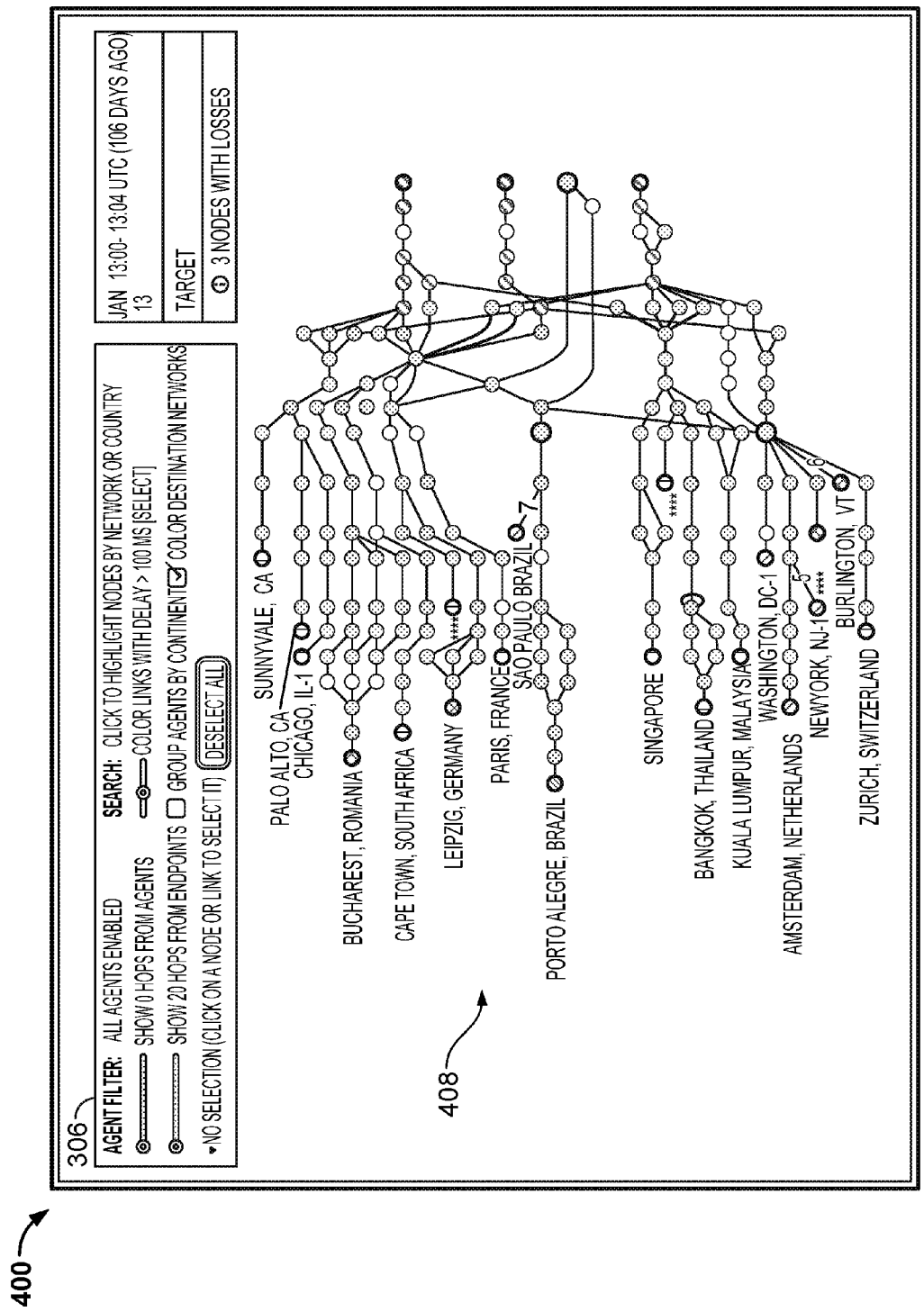
FIG. 4A illustrates a graph of a full connectivity visualization of a data path to a destination site in accordance with some embodiments.

FIG. 4A illustrates a graph of a full connectivity visualization of a data path to a destination site in accordance with some embodiments. In particular, FIG. 4A is a screen shot 400 of a GUI presented via an interface (e.g., using platform 100) that provides a visualization of a network performance using various techniques described herein. As shown at 306, various agent filters (e.g., configurations or settings) can be set for the agents. Based on the test results received from the distributed agents for the selected test(s) and agent filter input, a graph 408 is presented to provide a data path visualization of a data path to a destination site in accordance with some embodiments. In particular, FIG. 4A shows a hop-by-hop data path view from the agents (e.g., the agents as shown and discussed below with respect to FIGS. 5A-5C) to a target site, such as example web site (e.g., www.example.com).

Figure 4B:
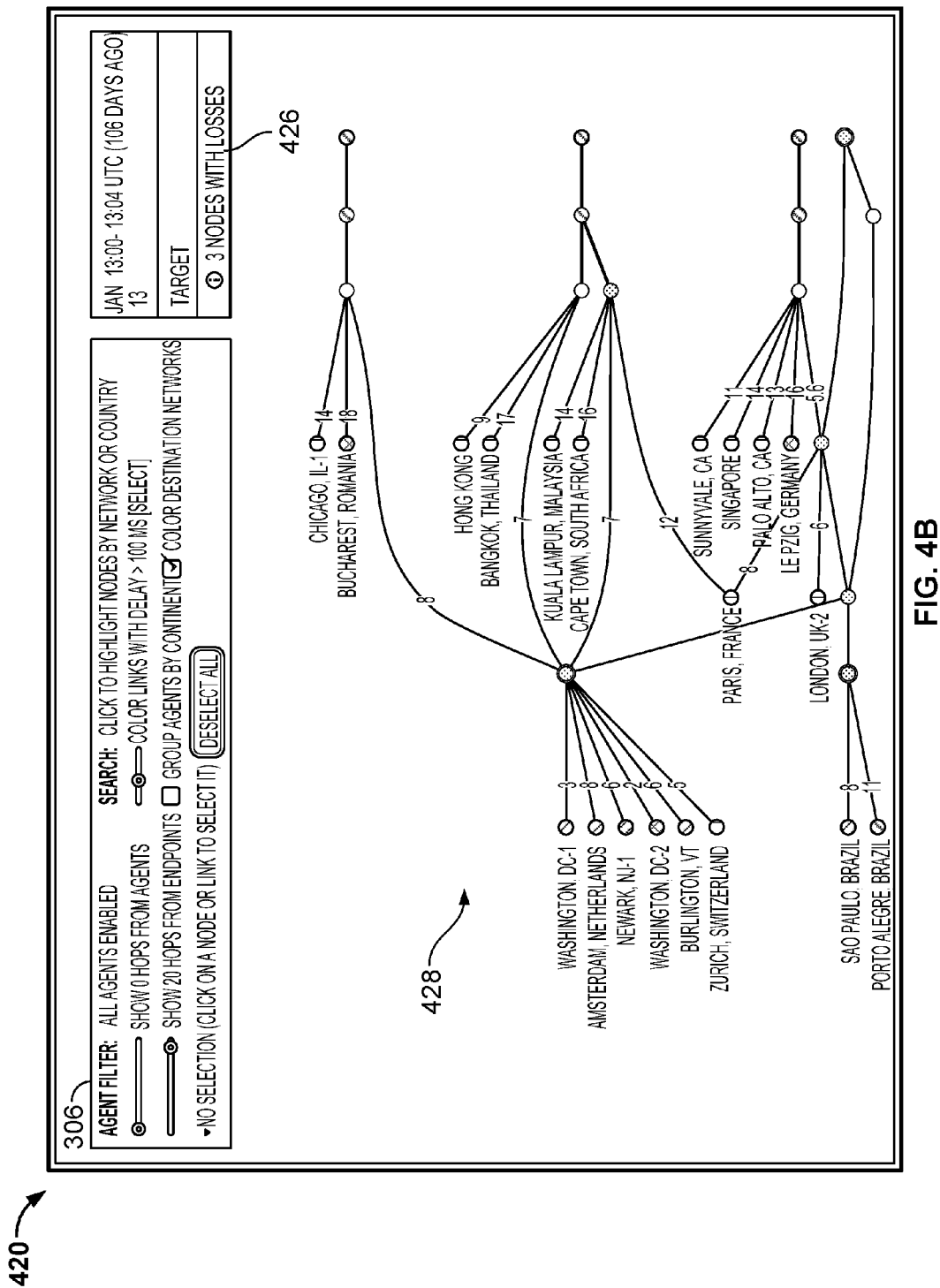
FIG. 4B illustrates a graph providing a simplified view of a visualization of a data path to a destination site in accordance with some embodiments.

FIG. 4B illustrates a graph providing a simplified view of a visualization of a data path to a destination site in accordance with some embodiments. In particular, FIG. 4B is a screen shot 420 of a GUI presented via an interface (e.g., using platform 100) that provides a visualization of a network performance using various techniques described herein. As shown at 306, various agent filters (e.g., configurations or settings) can be set for the agents. Based on the test results received from the distributed agents for the selected test(s) and agent filter input, a graph 428 is presented to provide a data path visualization of a data path to a destination site in accordance with some embodiments.

In particular, FIG. 4B is a simplified view of the FIG. 4A view of the hop-by-hop data path from agents to a target site, such as example web site (e.g., www.example.com), in which only show two hops away from the web site are shown (e.g., each IP address associated with the target site (e.g., example web site), which is associated with these three IP addresses, and hiding/consolidating all other hops except that all nodes with losses (e.g., nodes with losses exceeding a threshold) are shown in this view. For example, if a user selects "3 nodes with losses" as shown at component (e.g., a sub-window) 426 of FIG. 4B, then FIG. 4C is shown in accordance with some embodiments, as discussed below.

Figure 4C:
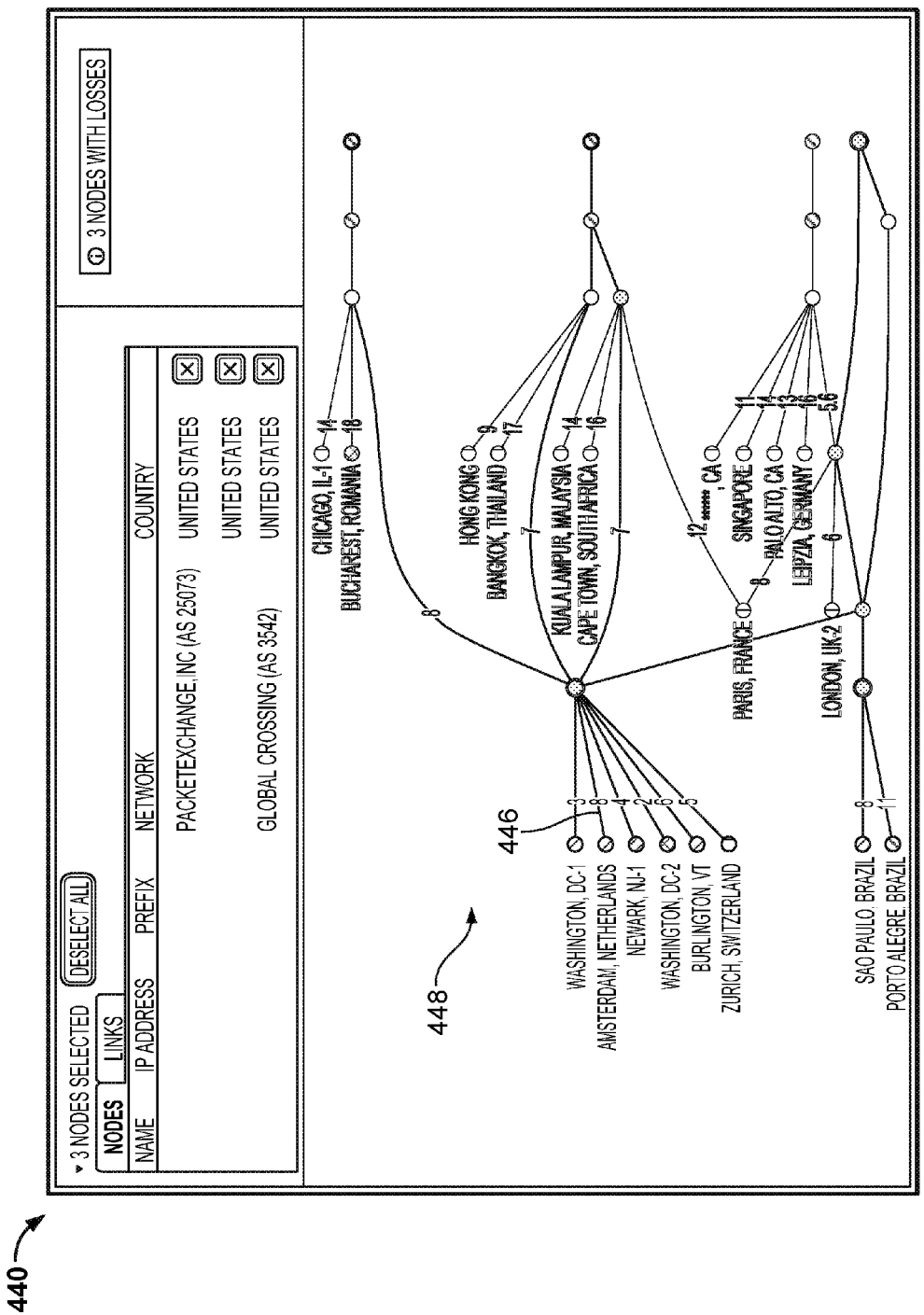
FIG. 4C illustrates a graph providing a simplified view of a visualization of a data path to a destination site with problem nodes in accordance with some embodiments.

FIG. 4C illustrates a graph providing a simplified view of a visualization of a data path to a destination site with problem nodes in accordance with some embodiments. In particular, FIG. 4C is a screen shot 440 of a GUI presented via an interface (e.g., using platform 100) that provides a visualization of a network performance using various techniques described herein.

As shown, FIG. 14C illustrates a simplified view of a graph 448 with problem nodes selected in accordance with some embodiments. In particular, FIG. 14C shows the result of a user selecting "3 nodes with losses" as shown at component (e.g., a sub-window) 426 of FIG. 4B. For example, this can allow the user to drill down to see more information regarding selected problem nodes. As shown in this example, each of the problem nodes is associated with a common provider that would be listed in the details window for each of these three problem nodes. If the user selects link 446 shown as (8) hops between Amsterdam, Netherlands, then the next hop/node is shown with losses as shown in FIG. 14D in accordance with some embodiments, as discussed below.

Figure 4D:
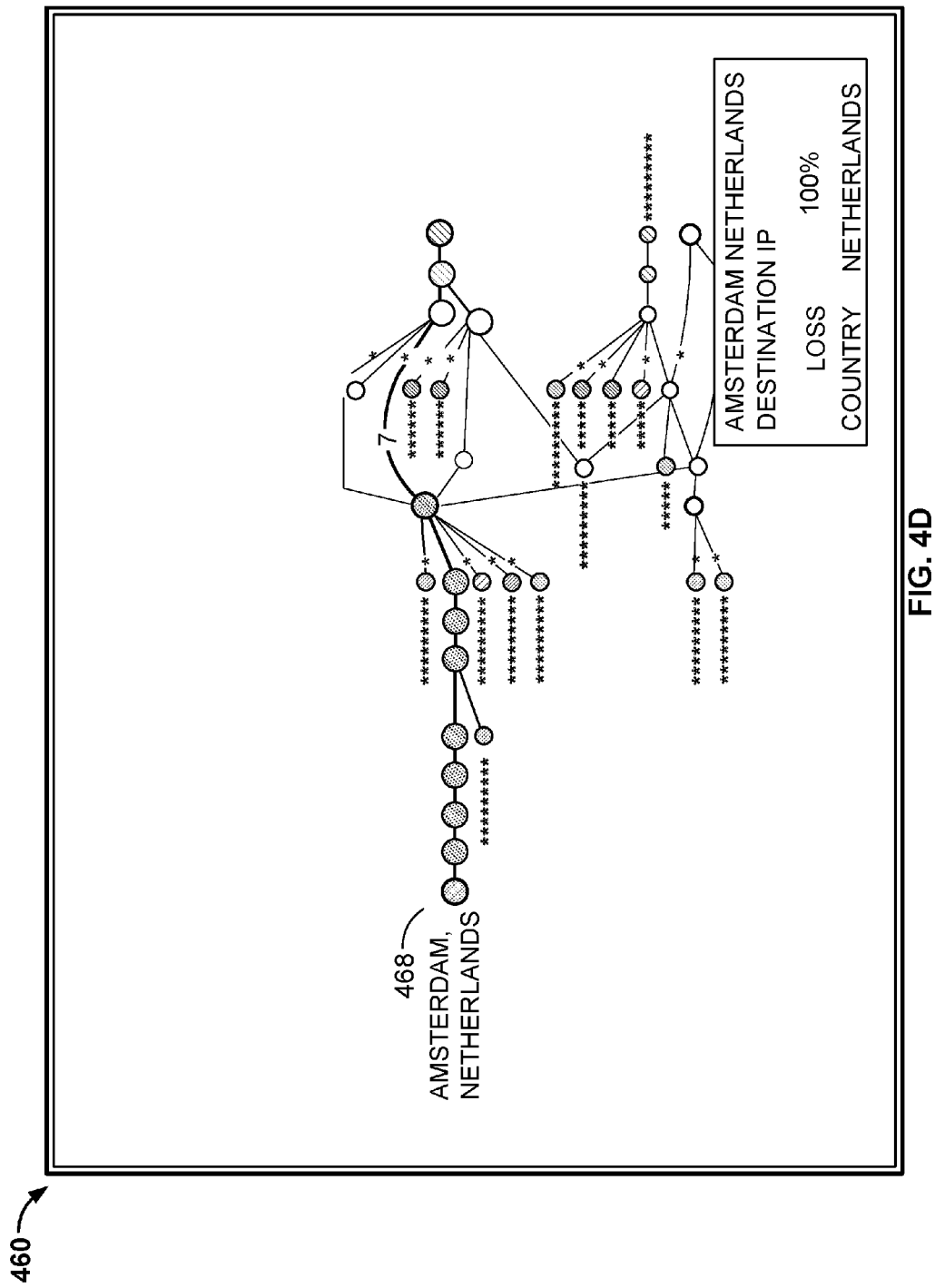
FIG. 4D illustrates a graph providing a selective exploration expanding a data path from selected source/agent site in accordance with some embodiments.

FIG. 4D illustrates a graph providing a selective exploration expanding a data path from selected source/agent site in accordance with some embodiments. In particular, FIG. 4D is a screen shot 460 of a GUI presented via an interface (e.g., using platform 100) that provides a visualization of a network performance using various techniques described herein.

As shown, FIG. 4D illustrates a graph 468 providing a selective exploration expanding a data path from Amsterdam in accordance with some embodiments. In particular, FIG. 4D illustrates an expanded data path if a user selects the link 446 shown as (8) hops between Amsterdam, Netherlands and the next hop/node shown with losses as shown in FIG. 4C, which thereby allowing for an expanded view of the intermediate hops on the data path from Amsterdam to that problem node as shown in FIG. 4C.

Figure 5A:
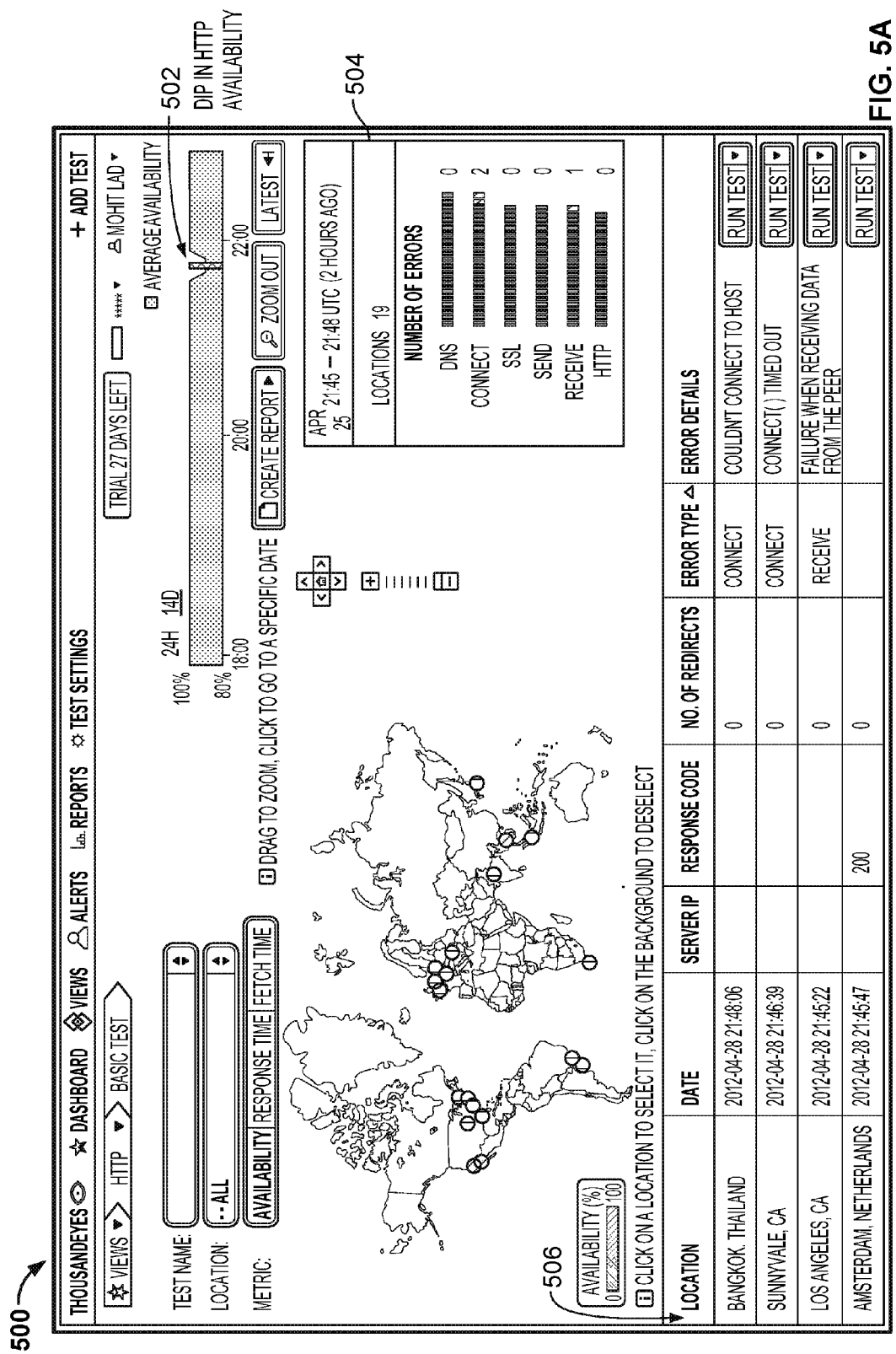
FIG. 5A is screen shot illustrating an HTTP availability drop during a particular time interval in accordance with some embodiments.
Figure 5B:
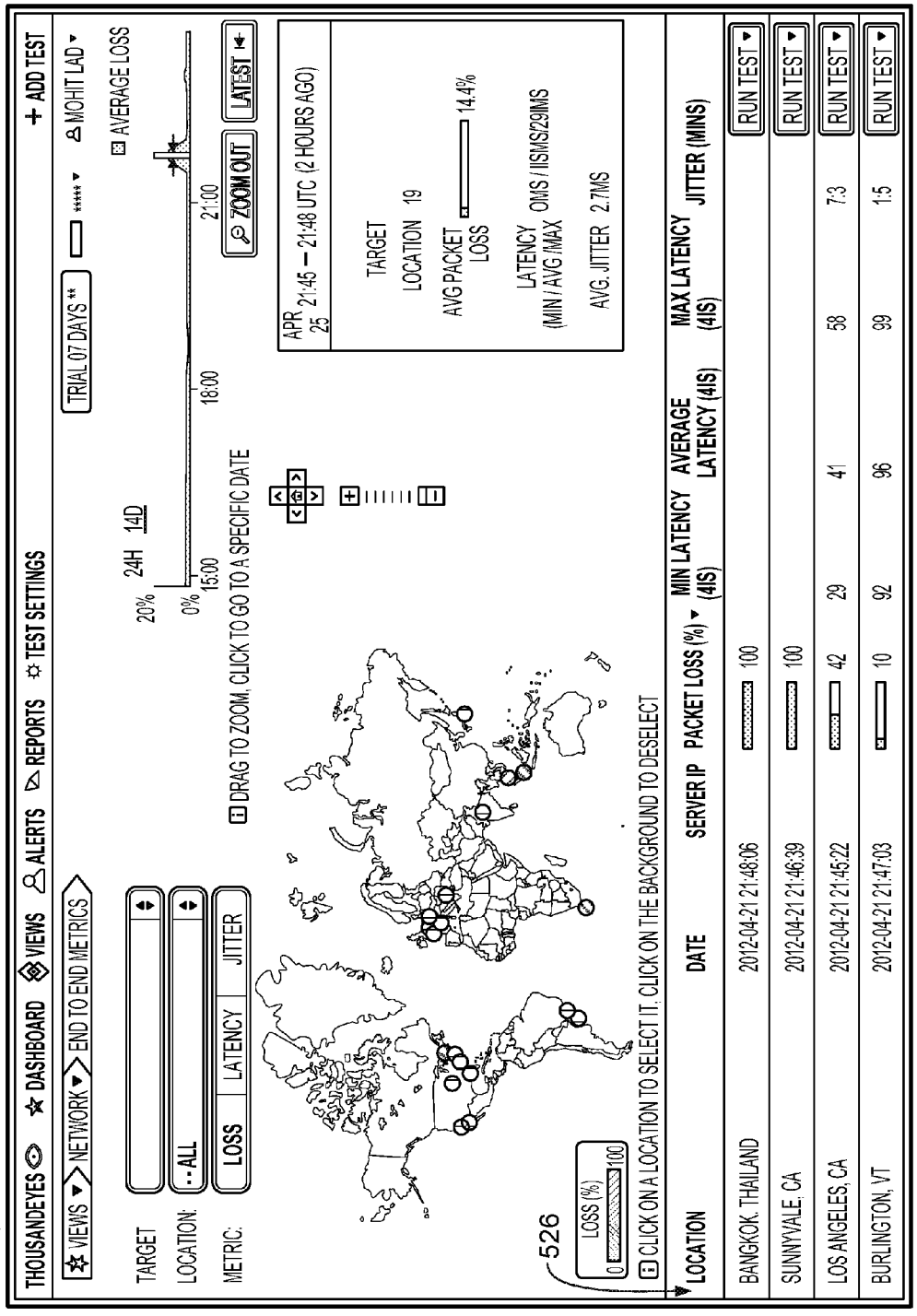
FIG. 5B is screen shot illustrating a network view that shows packet loss from the agents shown in FIG. 5A in accordance with some embodiments.
Figure 5C:
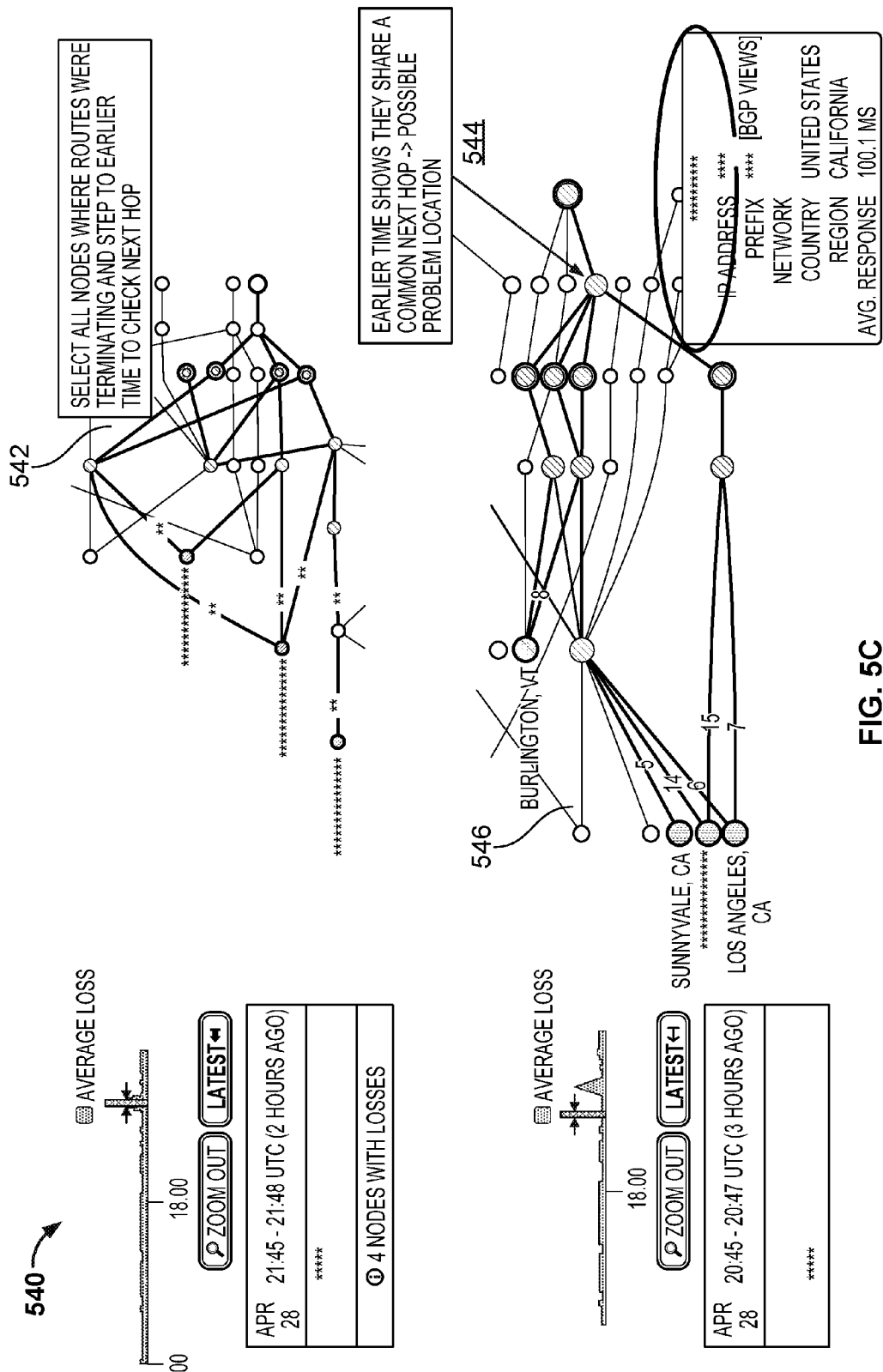
FIG. 5C is screen shot illustrating a visualization of a problem zone shown in FIG. 5B in accordance with some embodiments.

FIGS. 5A-5C illustrate examples of using cross-layer visibility of application delivery to determine, at different layers of a network, sources of one or more application delivery problems or performance issues in accordance with some embodiments, as discussed below.

FIG. 5A is screen shot illustrating an HTTP availability drop during a particular time interval in accordance with some embodiments. In particular, FIG. 5A is a screen shot 500 of a GUI presented via an interface (e.g., using platform 100) that provides a visualization of a network performance using various techniques described herein.

In particular, FIG. 5A shows a drop in HTTP availability at time interval 21:45-21:48 on April 28 as shown at 502. As shown at 504, a window is provided that shows a number of error by type, including the following: DNS, Connect (2 errors as shown), SSL, Send, Receive (1 error), and HTTP. At table 506, the details of these errors are also shown in a table format, in which a first column is a location of agent, date is a time of measurement, server IP is the destination address (e.g., target for HTTP availability testing), response code (e.g., HTTP response code, which is 200 if there are no errors, or empty if no response code received), and a number of redirects, error type (e.g., as discussed above), and error details (e.g., providing a description of the particular error, and a run test option can be provided to further diagnose this problem and to check if the problem still persists).

FIG. 5B is screen shot illustrating a network view that shows packet loss from the agents shown in FIG. 5A in accordance with some embodiments. In particular, FIG. 5B is a screen shot 520 of a GUI presented via an interface (e.g., using platform 100) that provides a visualization of a network performance using various techniques described herein.

Specifically, FIG. 5B illustrates a network view that shows packet loss, from the same agents as shown in FIG. 5A, in accordance with some embodiments. More specifically, FIG. 5B is a network view of the same destination at the same time interval for same destination, as shown in FIG. 5A. However, FIG. 5B provides a different view, a network view as shown, which indicates that the problem is a packet loss issue at the network layer. FIG. 5B illustrates that the cause of the HTTP availability drop shown in FIG. 5A is revealed by three agents that each have significant packet loss, such as shown in the details of the packet losses of these three agents in table 526, which are the same agents that were shown in FIG. 5A with problems on the HTTP tests/measurements. Accordingly, FIG. 5B reveals that the problem is not at the HTTP layer, but rather is a problem at the network layer at this particular time interval. Accordingly, this illustrates an example of various techniques disclosed herein for cross-layer visibility and troubleshooting of application delivery in accordance with some embodiments.

FIG. 5C is screen shot illustrating a visualization of a problem zone shown in FIG. 5B in accordance with some embodiments. In particular, FIG. 5C is a screen shot 540 of a GUI presented via an interface (e.g., using platform 100) that provides a visualization of a network performance using various techniques described herein.

Specifically, FIG. 5C illustrates a path visualization 546 highlighting a problem zone as shown at 544 (e.g., in which an earlier time as shown at 542 indicates that they share a common next hop, indicating the possible problem location or problem zone) in accordance with some embodiments. More specifically, FIG. 5C illustrates a hop-by-hop path visualization to determine the problem zone causing the packet losses, as shown in FIG. 5B. For example, the dashed circled nodes (e.g., some other icon indicator) can indicate the last known good hops on these paths, which indicates that the subsequent node(s), in this case it is a shared common next hop, thereby revealing that this hop is the likely root cause of the network packet loss on this data path. Accordingly, this illustrates an example of various techniques disclosed herein for cross-layer visibility and troubleshooting of application delivery in accordance with some embodiments.

Routing Paths
Collecting Routing Information

The Border Gateway Protocol (BGP) is a standard protocol used to exchange routing information between different Autonomous Systems (AS) (e.g., which is the control plane between different networks, such as between Verizon networks and Time Warner networks). An AS is an independently managed domain (e.g., an organization, such as Dell, which is associated with a particular AS number, such as AS number 3614, which is a unique identifier for Dell's network), typically having a one-to-one mapping to an organization. BGP messages carry routing information for individual prefixes (e.g., or group of IP addresses), and originate from the traffic destination outwards (e.g., BGP message propagation follows the opposite direction of traffic propagation).

In some embodiments, routing information is collected from public BGP data repositories that archive routing information from hundreds of routers across the Internet. For example, by looking at the AS PATH attribute of each message sent from router R, the routing path R was using at each time can be determined, and this information can also be used to determine when a certain destination IP address (e.g., or prefix) is/was not reachable from R.

In some embodiments, three different metrics for BGP visualization are provided: (1) reachability, (2) number of path changes, and (3) number of BGP updates. From the point of view of a router (or monitor), Teachability refers to the fraction of time that the router can reach a certain destination prefix. Path changes refers to the number of times the attribute AS PATH changed for a certain destination prefix. Updates refers to the plain count of BGP update messages received during the time interval.

For example, the BGP route information can be collected from RouteViews and/or RIPE-RIS (Routing Information Service), which publish BGP route information. As described herein with respect to various embodiments (see, e.g., FIGS. 8A-8B, which are described below), the BGP route information can be correlated with various other layers of network information to allow for visualization of this data and analysis of this data in a manner that facilitates cross-layer visibility and troubleshooting of application delivery (e.g., to determine if a problem is caused by a BGP routing information related problem, data path packet loss related problem, HTTP related problem, DNS related problem, and/or some other problem). As an example, by correlating cross-layer network data and visualizing such cross-layer network data, users can make better sense of such information and the correlation and presentation of such information can more clearly reveal if a BGP routing issue at a particular time interval may be a cause of various network problems during that time interval (e.g., HTTP measurement errors may actually be a result of this BGP routing issue, such as when looking at data path loss errors in which there are random drops at random locations, a user can then look to see if problem is at BGP level in which there may be no announced route to get to that network AS number, as that will cause the routers to just drop such packets for which it has no routing information).

Visualizing Routing Paths

Figure 6:
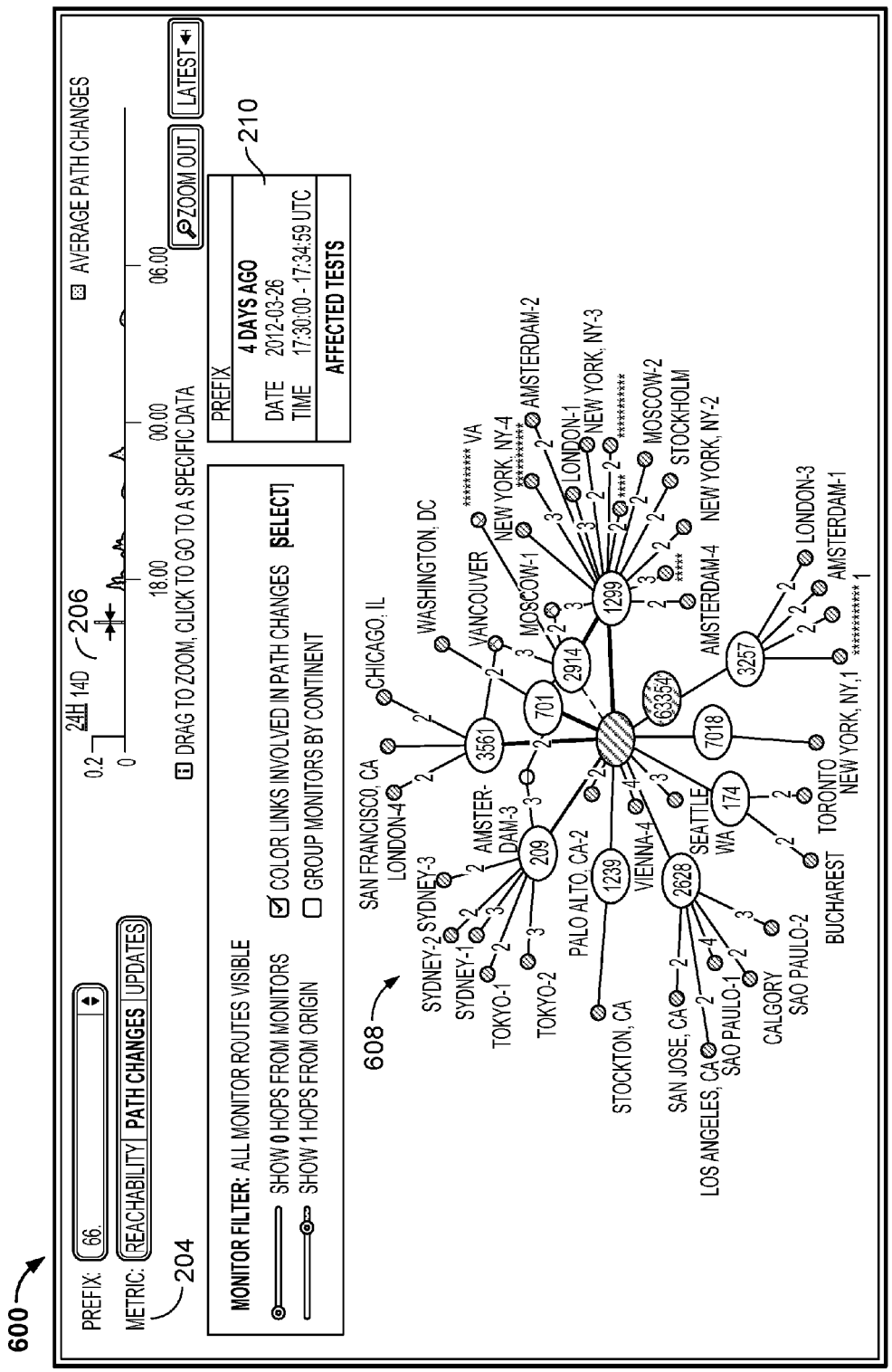
FIG. 6 illustrates a graph of a visualization of routing paths in accordance with some embodiments.

FIG. 6 illustrates a graph of a visualization of routing paths in accordance with some embodiments. In particular, FIG. 6 is a screen shot 600 of a GUI presented via an interface (e.g., using platform 10002) that provides a visualization of a network performance using various techniques described herein.

As shown, FIG. 6 illustrates similar components as in previous visualizations, including metric selector 204, timeline 206, graph 608, and summary components 210. In some embodiments, a force-directed layout is used to represent the origin of the routes in the center and the connected ASes (e.g., each node is an AS) laid out in a radial way as shown in the graph 608. Routers are shown as the leaf nodes of the graph 608 and are visually indicated according to the selected metric (e.g., visual indicators, such as colors and/or other visual indicators of such icons, can be used to indicate a selected metric). For example, the yellow/orange nodes (e.g., or some other visual indicator(s)) can correspond to routers that had path changes, while the green nodes (e.g., or some other visual indicator(s)) can correspond to routers that did not have any path changes.

As also shown in FIG. 6, the timeline 206 shows increments of 5 minutes (e.g., other time intervals/increments can be used or configured to be used), which are referred to as rounds. Data is visualized per round, and in each round, the paths are shown, using dashed style, and the final paths of the rounds are shown in solid style. The red dashed links (e.g., or some other visual indicator(s)) in the graph 608 corresponds to paths that were used at some point during the round, but were not in use at the end of the round, which, for example, can be useful to detect path exploration in BGP.

Path Simplification Algorithms

Currently if a node does not respond with a TTL expired, we leave the node white in the visualization. If there's loss, we might have a series of "white" nodes, typically followed by the destination, such as shown in FIG. 7.

Figure 7:
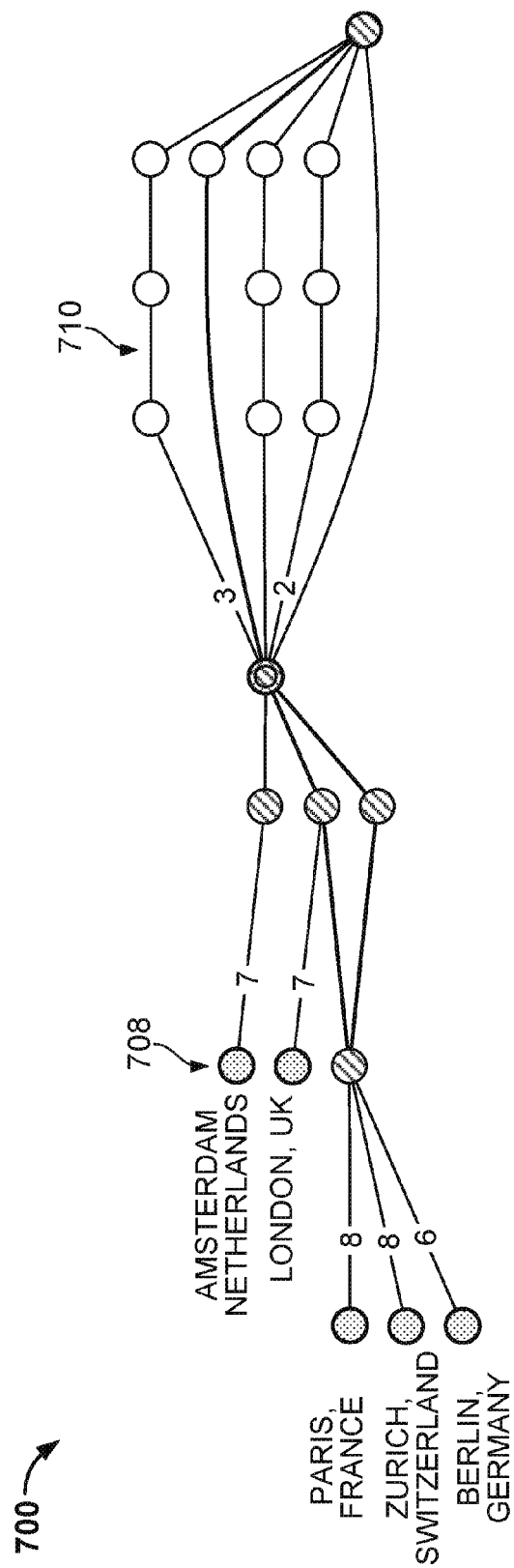
FIG. 7 illustrates a graph of a visualization of routing paths including a series of nodes indicating data loss in accordance with some embodiments.

FIG. 7 illustrates a graph of a visualization of routing paths including a series of nodes indicating data loss in accordance with some embodiments. As shown in graph 708, some of these white nodes 710 (e.g., or other visual indicators can be used to indicate such nodes) never reply to various agent testing, such as probes with ICMP Time Exceeded. These nodes can be referred to as real stars. Other nodes usually reply but, due to loss, occasionally the reply is not received. These nodes can be referred to as spurious stars. Distinguishing real stars from spurious stars is a challenging problem. For example, the challenge is that there is no other indication of packet loss, as both real stars and spurious stars look the same. However, a technique that can be used to address this issue by using a set of paths from multiple sources to a given destination is described below.

For example, for nodes in the middle of the path, losses will create diamond shaped elements of equal length. For example, two paths of equal length are shown below:

1: 3-x-x-5-6

2: 3-x-x-x-6 where the numbers represent different nodes in path visualization and the "x" represents a node that did not reply (e.g., referred to above as a white node). In this example, node 5 replied with Time Exceeded on path #1, but not on path #2. Diamond shapes can be detected in the graph and such can be reduced (e.g., path simplification can be performed) as follows:

A-path1-B

A-path2-B for every diamond A-B in the graph, if B is not the final destination, length(path1)=length(path2), and path1 and path2 are mergeable, then the paths are merged.

Mergeable paths are paths that do not have conflicting hops. For example, 3-4-x-6

3-5-x-6 are not mergeable, because 4!=5 but, as another example:

3-4-x-6

3-4-5-6 are mergeable as there are no conflicting hops. In this case, the paths can be merged into path 3-4-5-6.

Inferring Packet Loss

In some embodiments, every time a diamond gets reduced, loss on a certain link should be accounted for as discussed below. For example, two paths are shown below:
1: 3-4-5
2: 3-x-5
in which the above two paths can be merged into path 3-4-5. We know how many packets were routed through path #1 where 4 replied (e.g., N number of packets), and we also know how many packets were routed through path #2 where there was no reply after node 3 (e.g., L number of packets). Accordingly, the loss percentage on link 3-4 can be computed as L/(N+L). More generally, the loss of a node n can be determined by computing as the total number of packets lost in next hops divided by the total number of packets forwarded to next hops of n, as follows:

$$Loss(n) = Sum\ L(i)/Sum\ L(i) + Sum\ N(i)$$

For terminal nodes, such as nodes that do not have any next hops but are not a destination, the loss is always 100%. In some cases, it can also happen that a node is terminal for some routes, but not for other routes. In such cases, the loss can be computed as if there were a next hop on the terminal route where all N packets sent to it were lost. For these next hops, N is equal to the threshold of consecutive white nodes used in the terminal condition to stop probing a path.

In some embodiments, the graph visualization of such nodes marks loss using a visual indicator(s) (e.g., as a red circle on a node, the thickness of which is proportional to the loss percentage, or some other visual indicator(s) can be used). In some embodiments, a slider to control the amount of loss visible is provided (e.g., "Mark nodes with more than x % loss").

Diamonds Involving the Destination

In some embodiments, the destination is treated as a special case. The destination will reply to any TCP SYN packet it receives with a TCP SYNACK, which means that it will respond to any packet with TTL equal to or greater than the true number of hops to the destination. As a result, an algorithm that can be used for the destination case is similar to the path merging algorithm, but in this case paths are not required to be of the same length. For example, for the following paths:
A-path1-C
A-path2-C
where C is the destination, but path1 and path2 are of different lengths. Then, if path1 and path2 are mergeable, the path can still be reduced, such as follows:
A-x-x-x-x-C
A-B-C
the result of the path merging is A-B-C.

Conditions to Reduce a Diamond

In some embodiments, the condition to filter cases with real stars is as follows:
if we have
A-x-C
A-B-C
the diamond is reduced to A-B-C ONLY IF the following rules/conditions are satisfied:
(1) there is a dominant path inside the diamond that has a threshold percentage of routes going through it (e.g., at least 75%); in this case A-B-C needs to be a dominant path for the merging to occur; AND
(2) there is a minimum of four routes entering the diamond (e.g., this can be required to avoid false positives closer to the agents were routes are less dense); as three routes per agent are collected (e.g., in which this last condition also forces the diamond to have routes from at least two different agents).

Special Cases

In some embodiments, there are some special cases where the above discussed two rules/conditions (e.g., default rules) are altered slightly. For example, given a mergeable diamond with source node A and destination node B:

(1) If B is actually the destination and rule 1 does not apply (e.g., none of the paths in the diamond is dominant), but rule 2 still applies (e.g., at least 4 routes are entering the diamond), then paths can be simplified/reduced with only stars into a single hop notated with "?" indicating the uncertainty in the number of hops. For example:
A-x-B
A-x-x-B
A-x-C-B
can be reduced to:
A-?-B
A-x-C-B
The "?" link is used in this example, because there is not enough information is available to determine the true number of hops (e.g., or true number of distinct paths) between A and B with sufficient certainty.

(2) If there are more than two distinct paths inside a diamond, do not perform a merge unless there is a dominant path that originates from the same agent as the mergeable path. For example:
agent1-A-B-x-F
agent2-A-B-C-F (dominant)
agent3-A-B-D-F
could not be reduced, even though A-B-C-F is dominant; neither A-B-C-F nor A-B-D-F appears in a path originating from agent1, which of the two (if any) agent1 is connected to cannot be determined. However, if the following path:
agent1-A-B-C-F
were also present in the above example, the path with the star could be merged into A-B-C-F according to the default rules as discussed above.

Information Over Time Versus Over Space

As discussed above, information collected from multiple sources can be used to infer the reality of a path from a single source. Similar techniques can be used across the time dimension. For example, by looking at the data on the preceding and subsequent intervals, the reality of the path can be inferred at the current interval. Although the space-based approach discussed above can be more convenient in some cases, such as if the necessary information is readily available at the time of visualization, in other cases, a time-based approach can also be used, such as for cases where not enough data in one time slice is available to get an accurate representation of a path.

Inferring MPLS Tunnels

In some embodiments, MultiProtocol Label Switching (MPLS) tunnel inference for characterizing and/or annotating links/nodes is provided using various techniques described below. For example, depending on the implementation of RFC4950 or the TTL-Propagate configuration parameter on routers, there can be different types of MPLS tunnels. The below table provides a description of the options.

| Tunnel Type | RFC4950 | TTL-propagate |
| --- | --- | --- |
| Explicit | Enabled | Enabled |
| Implicit | Disabled | Enabled |
| Opaque | Enabled | Disabled |
| Invisible | Disabled | Disabled |

Explicit MPLS Tunnel

FIG. 19A illustrates a graph of a visualization of routing paths including a link that is indicated to be part of an explicit MPLS tunnel in accordance with some embodiments. For example, explicit MPLS tunnels (e.g., tunnels not obscured using router configuration) can be displayed in full, with the links between each hop of an MPLS network being shown, including with label information. In this example implementation, when an MPLS hop is detected in the path, a quick selection link can be provided to identify links that are part of MPLS networks, and display the label stack used to route the packet, when hovered over an affected link. Referring to FIG. 19B, a link 1902 is determined to be part of an explicit MPLS tunnel, and link information that is provided using the label information is shown at 1904.

Implicit MPLS Tunnel

FIG. 19B illustrates a graph of a visualization of routing paths including a link that is indicated to be part of an implicit MPLS tunnel in accordance with some embodiments. For example, when network devices (e.g., such as a router or other network devices) are configured not to send MPLS stack entries, that the link is part of an MPLS tunnel can be inferred, and an attempt to infer the hop number of the tunnel can also be performed using techniques disclosed herein, such as described below. This can be represented in as Hop X in an MPLS Tunnel. While no label information may be available (e.g., due to provider router configuration), having the source IPs of the transit network may allow a service provider to cross-reference the externally-visible map against internal documentation, to determine the true path taken. In particular, implicit tunnels can be inferred by examining a returned IP TTL in ICMP Time Exceeded packets. If the TTL is 2, then the packet is determined to have expired, as a result of MPLS TTL expiration, and that the link is the second hop in an MPLS tunnel can be inferred. Referring to FIG. 19B, a link 1922 is determined to be part of an implicit MPLS tunnel, and link information is shown at 1924.

Opaque MPLS Tunnel

Figure 19C:
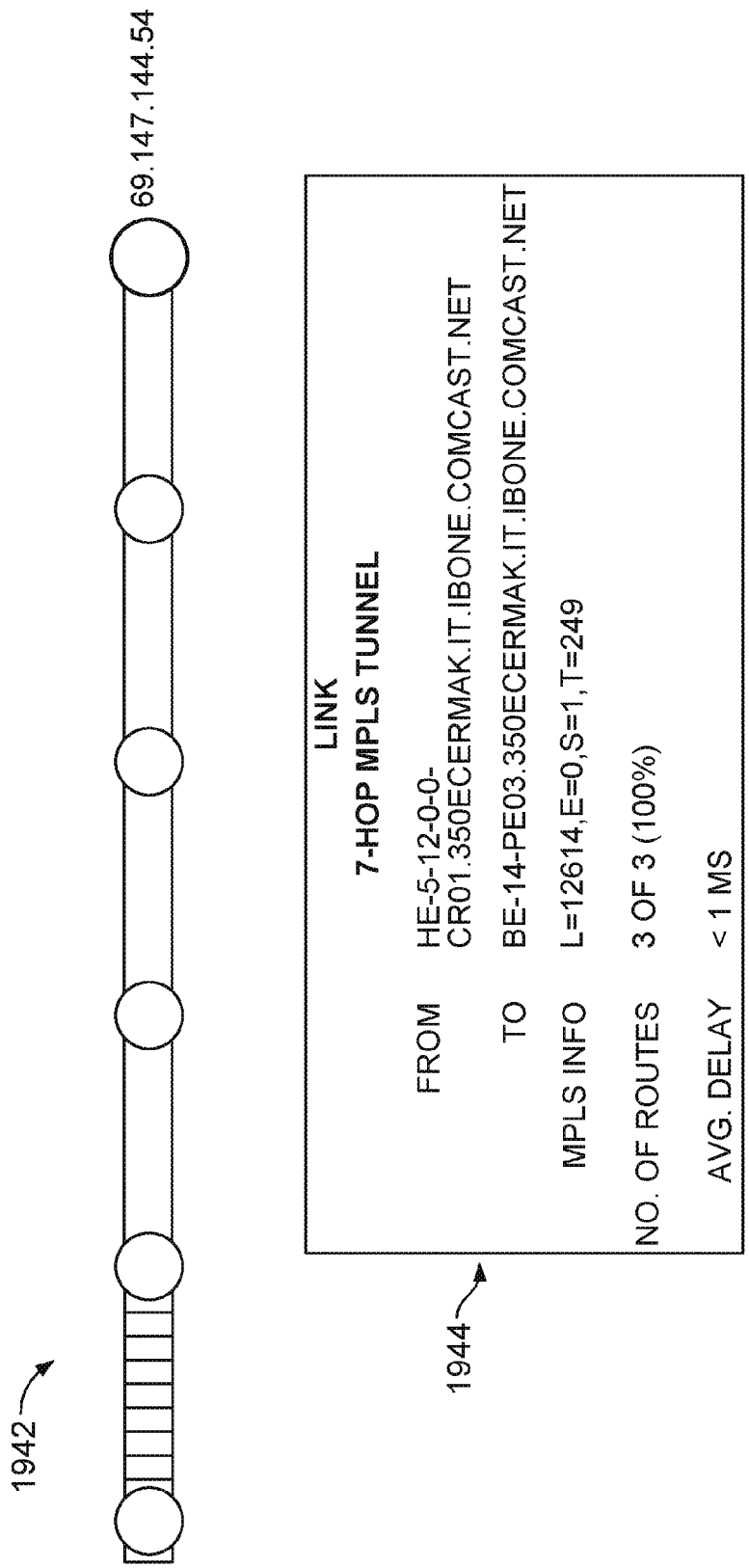
FIG. 19C illustrates a graph of a visualization of routing paths including a link that is indicated to be part of an opaque MPLS tunnel in accordance with some embodiments.

FIG. 19C illustrates a graph of a visualization of routing paths including a link that is indicated to be part of an opaque MPLS tunnel in accordance with some embodiments. For example, in circumstances where a single MPLS label is encountered but the IP TTL is reset at an ingress router, it is possible to show the single hop, as an X-hop MPLS tunnel. This information can be helpful when diagnosing network connectivity issues while transiting a service provider's network, because some hops may be obscured from the path visualization output, inferring a sometimes incorrect one-hop transit across the MPLS network. In an example implementation, a length of such an MPLS tunnel can be inferred by looking at the quoted TTL (q-TTL) in the MPLS stack (e.g., if q-TTL=253, then the tunnel has 255−253+1=3 hops). Referring to FIG. 19C, a link 1942 is determined to be part of an opaque MPLS tunnel, and link information is shown at 1944.

Invisible Tunnel

As another example, in circumstances where no MPLS label is shown, and the TTL is not reset, then the presence of an MPLS tunnel may not be detected, and an erroneous link can be inferred.

Annotating Topology with Interface MTU

Figure 20:
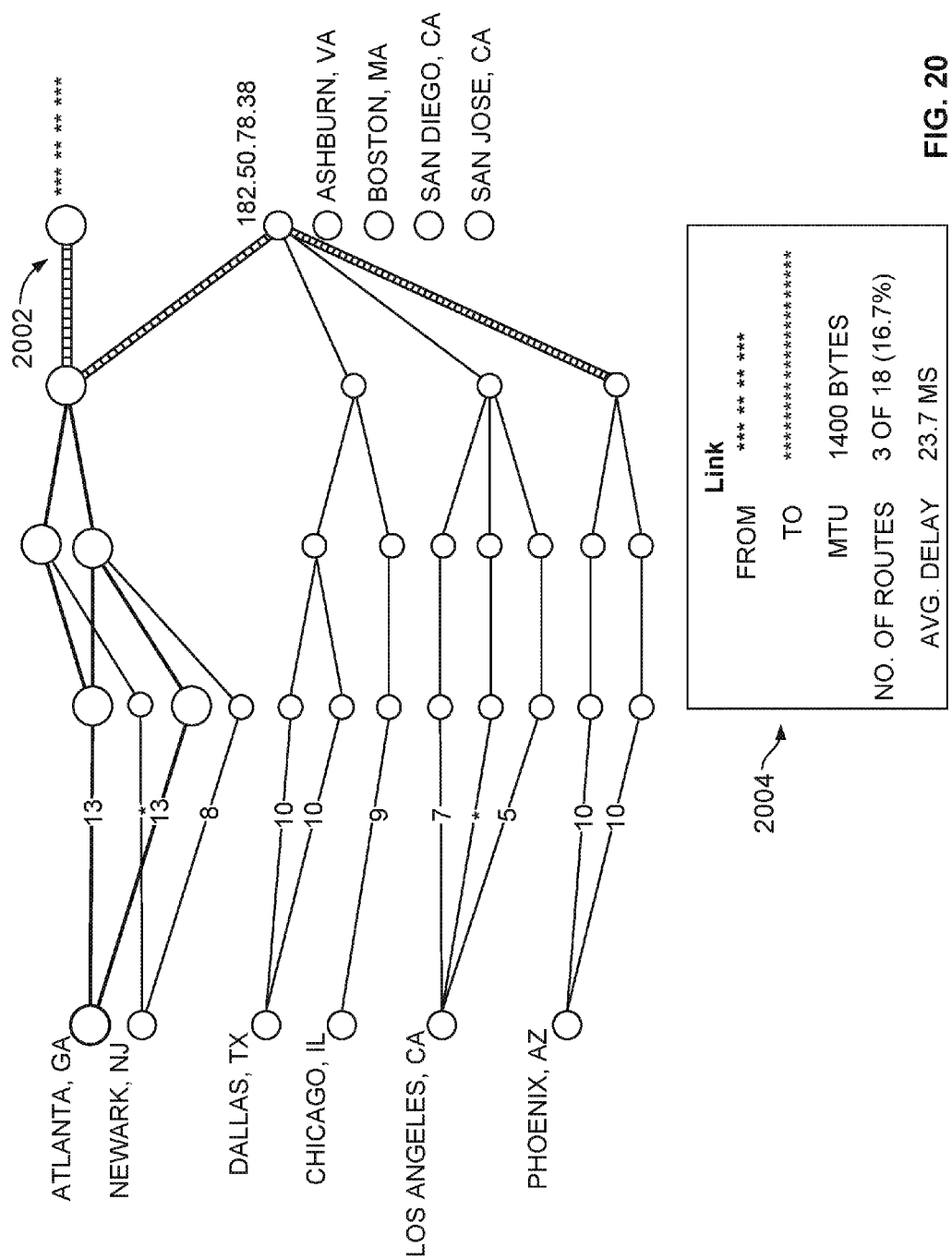
FIG. 20 illustrates a graph of a visualization of routing paths annotated using interface Maximum Transmission Unit (MTU) techniques in accordance with some embodiments.

FIG. 20 illustrates a graph of a visualization of routing paths annotated using interface Maximum Transmission Unit (MTU) techniques in accordance with some embodiments. In an example implementation, a Path MTU Discovery (PMTU) can be executed from each agent, which can be performed to infer the links that show a decrease in the MTU. For example, this can be useful to identify entry points to tunnels (e.g., VPN tunnels or IPv6 in IPv4 tunnels). Referring to FIG. 20, a value of the MTU of link 2002 is provided in link label 2004. In particular, FIG. 20 represents an example of a network where the last hops are VPLS tunnels, and the highlighted link represents the encapsulation point with an MTU of 1400 bytes. In some implementations, the agent can also annotate the link with the final result of PMTU Discovery, and, for example, alert the user if this value is <1280 for IPv6 or <576 for IPv4 (e.g., or some other values), or if the PMTU process failed. These values are selected in this example as these are the minimum requirements imposed by applicable IETF standards. For example, in IPv6, the end-hosts are responsible for fragmenting the packets, unlike IPv4 where middle devices can perform fragmentation. Therefore, in IPV6, end-hosts generally need to be able to run PMTU successfully to determine the maximum packet size they can send. For example, this can be especially critical for various applications, such as DNSSEC over IPv6 where payloads higher than 1280 bytes may be required. As will be apparent to one of ordinary skill in the art, the various techniques described herein can be applied to various different network communication protocols, including, for example, both IPv6 and IPv4, as well as TCP, UDP, and ICMP transport.

Annotating Topology with TCP MSS

Figure 21:
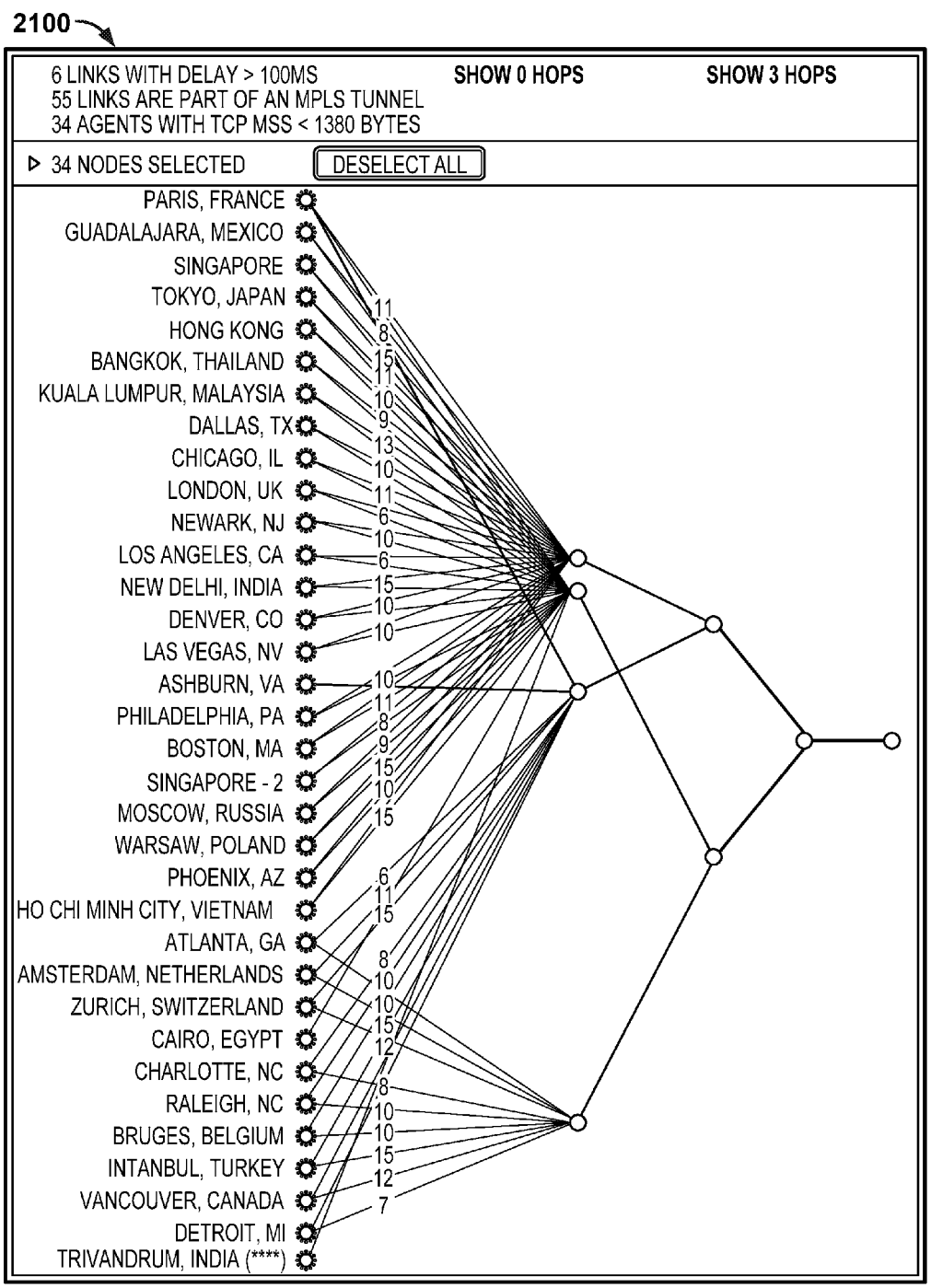
FIG. 21 illustrates a graph of a visualization of routing paths annotated using TCP Maximum Segment Size (MSS) techniques in accordance with some embodiments.

FIG. 21 illustrates a graph of a visualization of routing paths annotated using TCP Maximum Segment Size (MSS) techniques in accordance with some embodiments. As discussed above with respect to FIG. 20, a network topology can be annotated using interface MTU techniques. In some implementations, a network topology can also be annotated using TCP MSS techniques as described below. For example, the TCP MSS for TCP-based network tests can be measured. The MSS value is generally lower than the MTU, which also typically accounts for IP+TCP headers. For example, low values of MSS can result in inefficient TCP connections, because more packets are then used to send the same amount of data. Also, cases where MSS+Headers>PMTU will originate TCP packet loss and retransmissions until the sender receives the ICMP Packet Too Big message, after which it will reduce its MSS size. As such, these techniques can be implemented to detect and inform users on cases where the MSS value is small, or when the MSS value is too large, which causes IP fragmentation. Referring to FIG. 21, this figure illustrates an example where the value of the MSS is set to a relatively small value (e.g., 536 bytes), which is affecting all agents reaching the server as shown.

Case Studies

Figure 8:
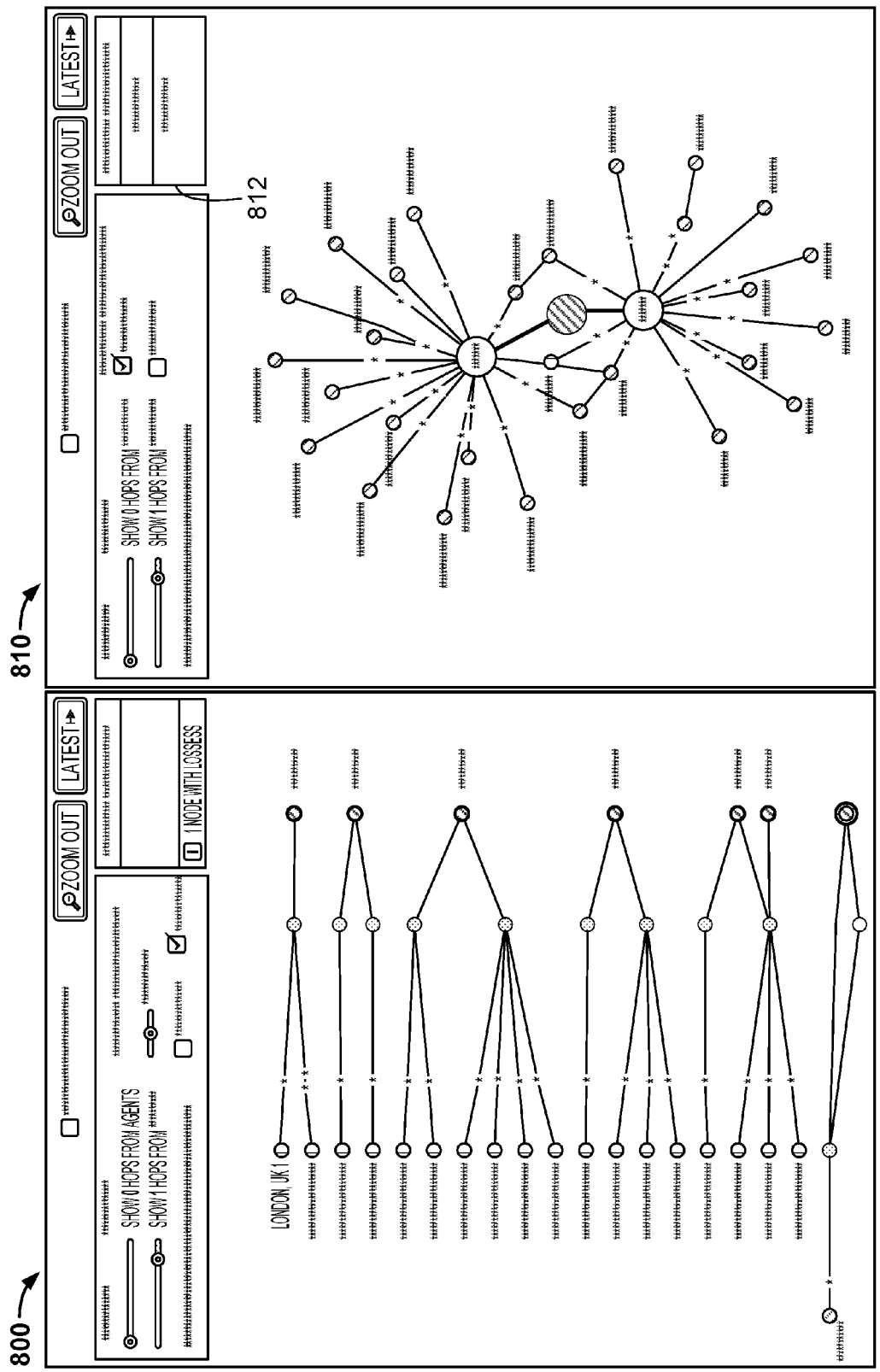
FIG. 8A and FIG. 8B illustrate views for showing Border Gateway Protocol (BGP) and packet loss in accordance with some embodiments.

FIG. 8A and FIG. 8B illustrate views for showing Border Gateway Protocol (BGP) and packet loss in accordance with some embodiments. FIGS. 8A and 8B are screen shots 800 and 810, respectively, of a GUI presented via an interface (e.g., using platform 100) that provides a visualization of a network performance using various techniques described herein.

In particular, FIG. 8A illustrates a data path view in which a data path from source site (e.g., Chicago node) to the lowest listed destination does not have an IP address and is shown as having packet loss (e.g., using a visual indicator for that destination node, such as a color coded indicator or other graphical user interface related visual indicator(s)). FIG. 5B illustrates a BGP view, in which a window 812 shows an IP address destination for which there are no routes to reach that destination, which corresponds to the path from Chicago for which there is packet loss on the path as shown in the data path view of FIG. 8A. Accordingly, FIGS. 5A and 5B illustrate the user of cross-layer visibility and troubleshooting into application delivery in which a root cause of a packet loss seen on the Chicago node in FIG. 8A can be illustrated by navigating to a BGP view for that same time interval to determine that the Chicago node was unreachable due to BGP route information related problems. In particular, FIG. 8B provides a visual representation that explains that the packet loss seen on the Chicago node in FIG. 8A is a result of the unavailability to a certain BGP prefix.

DNS

Collecting and Visualizing DNS Information

Figure 9:
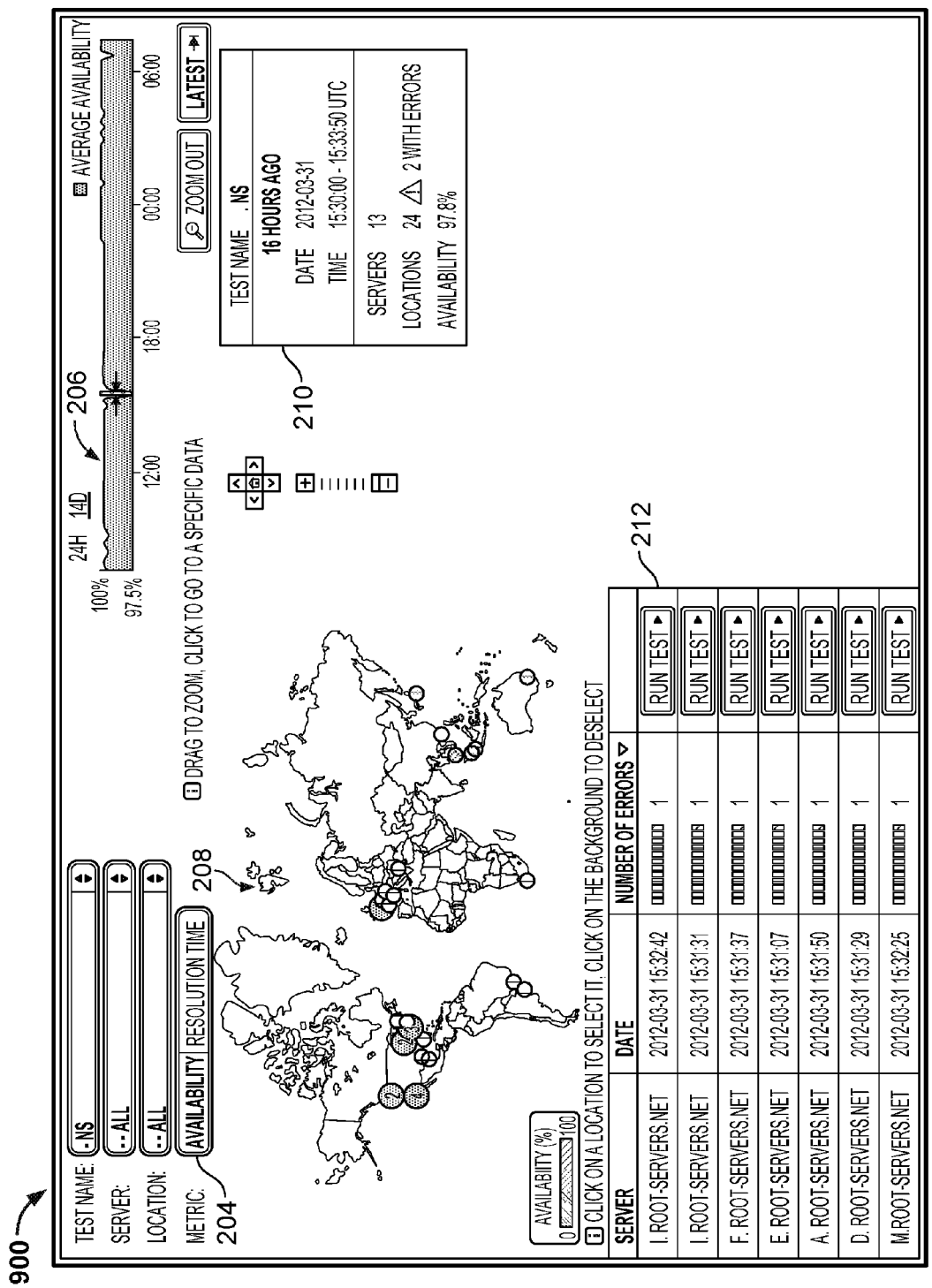
FIG. 9 illustrates a visualization of DNS data in accordance with some embodiments.

FIG. 9 illustrates a visualization of DNS data in accordance with some embodiments. In particular, FIG. 9 is a screen shot 900 of a GUI presented via an interface (e.g., using platform 100) that provides a visualization of a network performance using various techniques described herein.

In some embodiments, a DNS test (e.g., that can be performed by one or more distributed agents and controlled by agent controllers, such as agent controllers 114) includes several authoritative name servers that serve a specific domain name. For example, DNS queries from agents can be sent to the specified DNS servers targeting the specified domain name (e.g., one or more domain names that an entity wants to test for, such as www.domain-name.com). For example, the following cases can be marked as errors:

The absence of a reply—the name server does not reply within a certain timeout to the query.

An empty reply—the name server replied with an NXDOMAIN, or an empty resource record.

This technique can be used for identifying and resolving application level problems (e.g., application layer response time), as DNS tests can be correlated to identify which DNS name server(s) may be the root of the problem. For example, if a problem is identified with a particular DNS name server, then a user can drill down to the network layer view to determine if it is a network problem to access that DNS name server from a particular location (e.g., a location at which one or more agents are present for such testing).

As shown in FIG. 9, various visualization elements are provided that are similar to previously discussed views. For example, metric selector 204 can be used to choose between Availability and Resolution Time. Timeline 206 can be used to select an instant in time to drill down to. World map 208 shows a geographical representation of the problem. Summary window 210 shows a small summary of the metrics/number of errors. Table 212 shows the breakdown of the DNS tests per location.

For example, when no server is selected, the view can show aggregated metrics (e.g., average for the case of Availability and Minimum value for the case of Resolution Time). A minimum can be selected as this is the most likely the value a DNS resolver would get if it had to query multiple authoritative servers for a domain.

DNSSEC

In some embodiments, a similar visualization for DNSSEC is provided, such as for the DNS extension that adds authentication and data integrity to DNS. In order to test DNSSEC delegation chains, a test from each agent is provided in which the test can start at the bottom of the chain and verify signatures all the way to the top of the chain. An error is triggered if there is any step in the resolution chain that fails, either because a resource record is missing or because a signature does not match.

Case Studies

Figure 10:
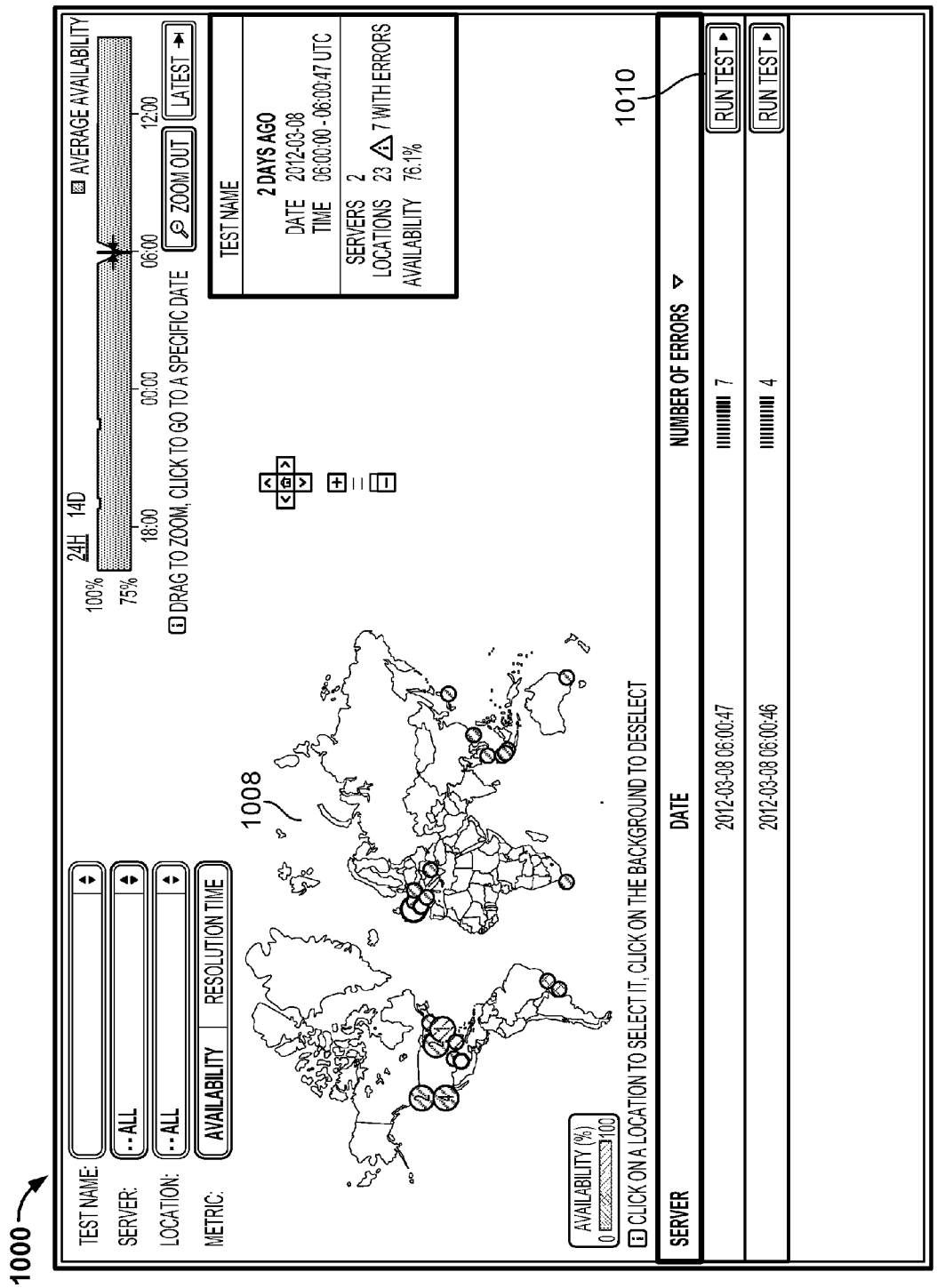
FIG. 10 illustrates Anycast debugging, to identify any relevant DNS problems, in accordance with some embodiments.

FIG. 10 illustrates Anycast troubleshooting, to identify any relevant DNS problems, in accordance with some embodiments. In particular, FIG. 10 is a screen shot 1000 of a GUI presented via an interface (e.g., using platform 100) that provides a visualization of a network performance using various techniques described herein.

In particular, FIG. 10 illustrates a DNS view, illustrating DNS resolutions to the DNS servers server1.com (e.g., showing four errors in this example) and server2.com (e.g., showing 7 errors in this example) in table 1010, which are geographically represented by location in red on the world map view 1008, and the time interval is 6:00-6:00:47 on 3-8-2012.

Figure 11:
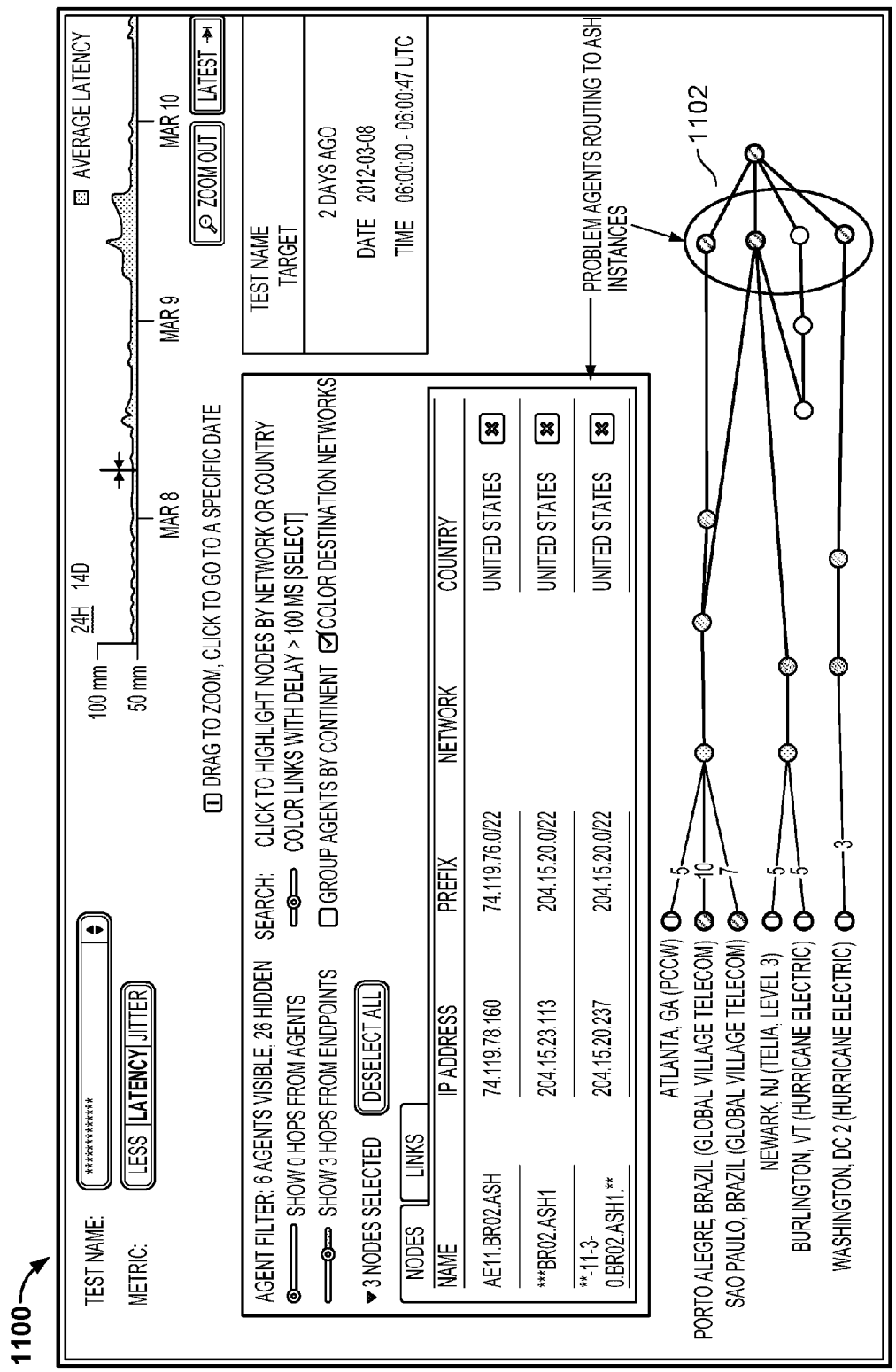
FIG. 11 illustrates a path visualization that shows all problem agents routing to an Ashburn, Va. instance in accordance with some embodiments.

FIG. 11 illustrates a path visualization that shows all problem agents routing to an Ashburn, Va. instance in accordance with some embodiments. In particular, FIG. 11 is a screen shot 1100 of a GUI presented via an interface (e.g., using platform 100) that provides a visualization of a network performance using various techniques described herein.

In particular, FIG. 11 illustrates a path visualization to server2.com in path visualization graph 1102. In this example, DNS Anycast is used, which can announce its IP from several different locations (e.g., five different locations). This shows that a commonality among the agents that have DNS errors is that all of these agents are performing their DNS lookup with this particular Anycast server in Ashburn Va., which can be inferred after looking at the location of the hops immediately preceding the server in path visualization graph 1102 as shown.

HTTP

Figure 12:
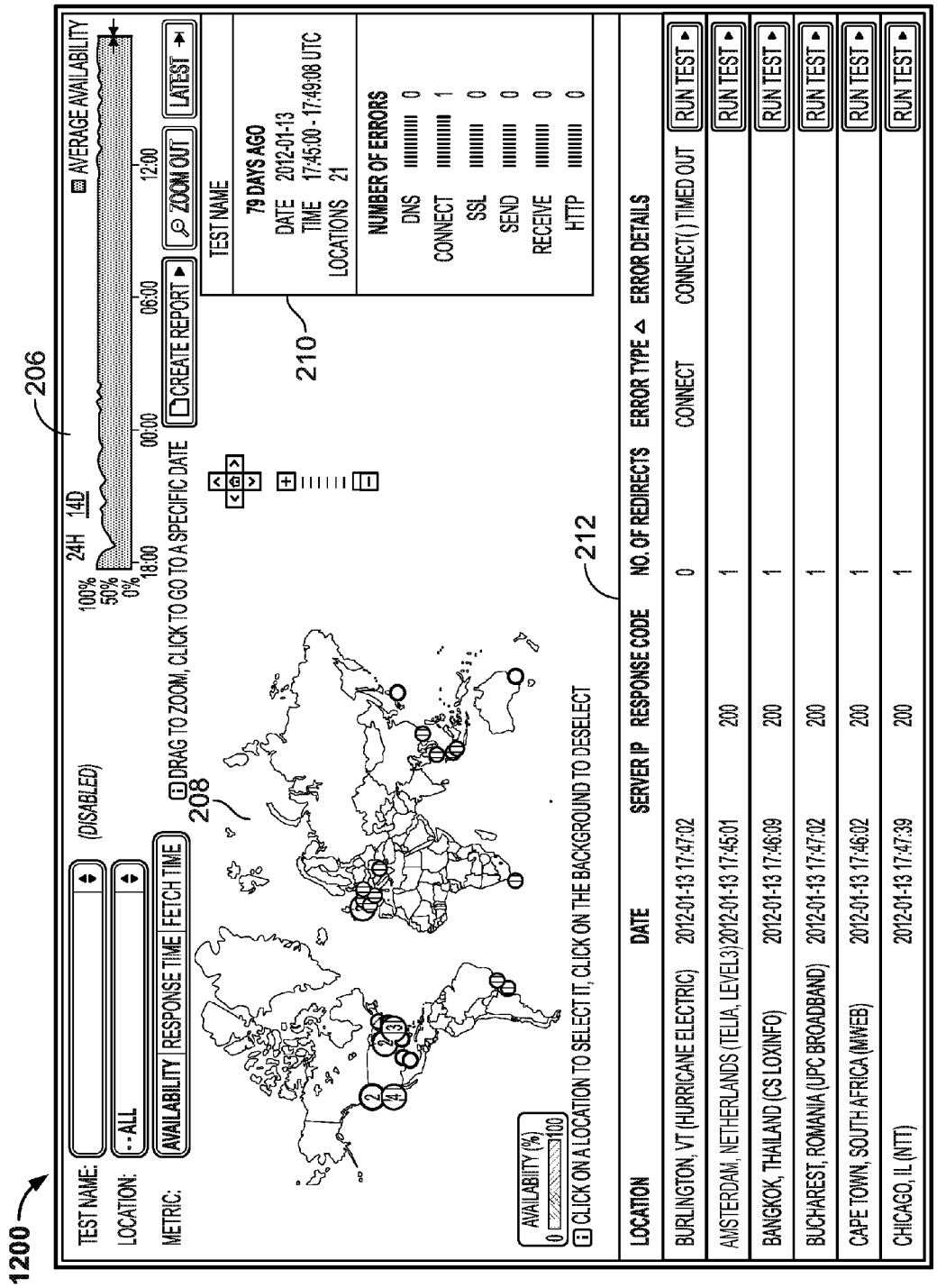
FIG. 12 illustrates a visualization of HTTP data in accordance with some embodiments.

FIG. 12 illustrates a visualization of HTTP data in accordance with some embodiments. In particular, FIG. 12 is a screen shot 1200 of a GUI presented via an interface (e.g., using platform 100) that provides a visualization of a network performance using various techniques described herein. The various other components as shown in FIG. 12 are similar to components shown in previously discussed views, including timeline 206, world map 208, summary 210, and table 212 components of the screen shot 1200.

In some embodiments, for HTTP tests, the URL to be tested is fetched from each agent location, the time to complete each step is measured, and whether there was an error at any particular step is determined and recorded. For example, an HTTP fetch can include the following steps: DNS resolution, TCP connection establishment, SSL certificate exchange, HTTP GET request, and/or HTTP response. In some cases, the HTTP tests can capture the following metrics: Availability: an indication of errors, the aggregate availability is the fraction of agents that complete the test without any error; Response Time: or Time to First Byte (TTFB) is the time it takes for the client to start receiving HTTP data from the server; this metric is useful to understand if delays are coming from network or from backend;

typically slow response times are caused by slow networks; and/or Fetch Time: this is the time it takes to actually receive all the HTTP data.

Web Page

Figure 13:
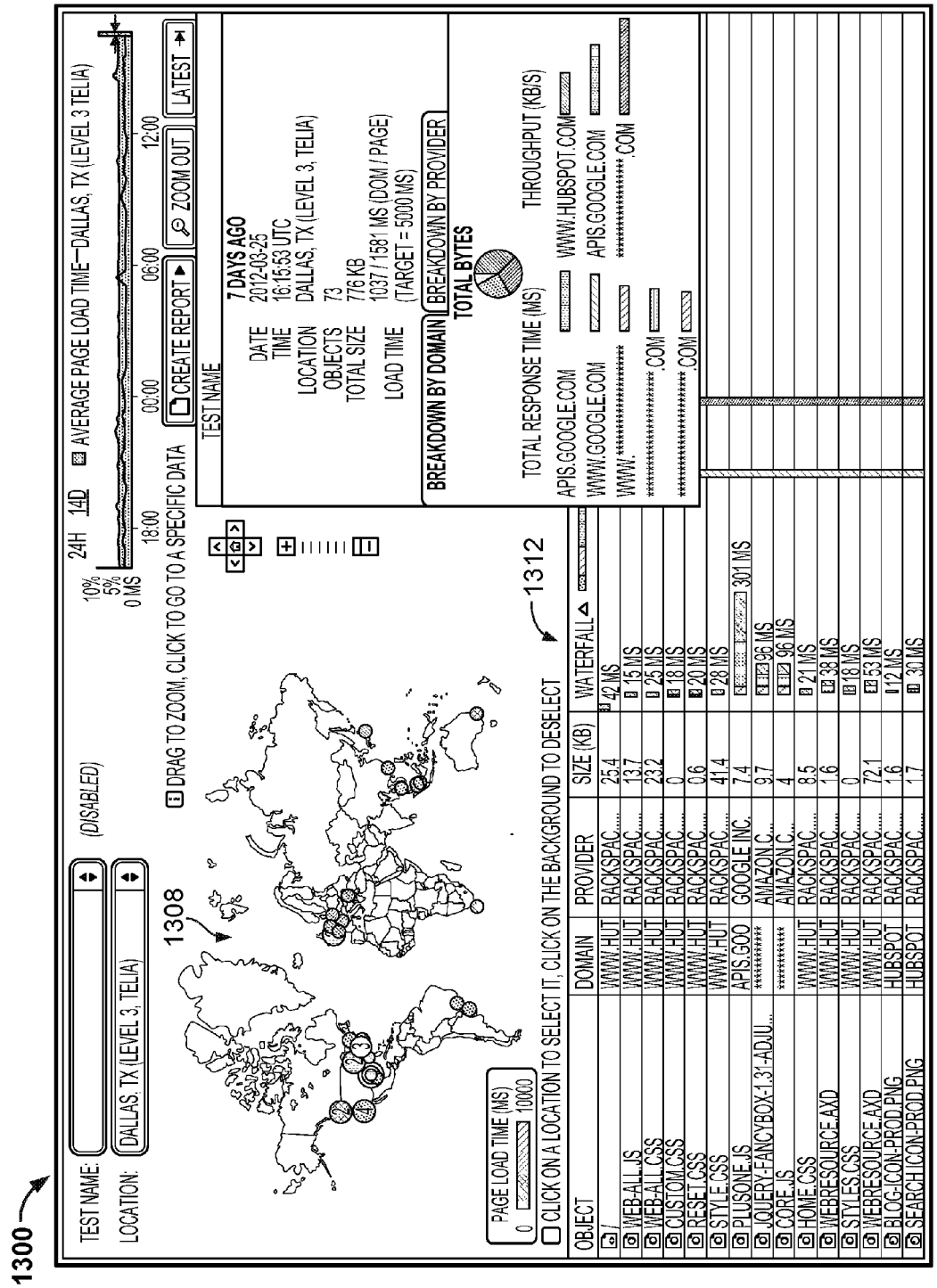
FIG. 13 illustrates a visualization of a web page load performance in accordance with some embodiments.

FIG. 13 illustrates a visualization of a web page load performance in accordance with some embodiments. In particular, FIG. 13 is a screen shot 1300 of a GUI presented via an interface (e.g., using platform 100) that provides a visualization of a network performance using various techniques described herein.

In some embodiments, in order to measure the performance of an entire web page, real web browsers can be used by agents (e.g., web testing agents that can be distributed and controlled by agent controllers, such as agent controllers 114) to load the web page(s) from different locations and extract the performance for each of the components of the web page(s). For example, the components can be grouped per domain and per provider to rank Response Time and Throughput, and to better identify bottlenecks. Example metrics can include the following: DOM time: the time it takes for the document object model (DOM) to build; after the DOM is created, the user can start interacting with the page; and/or Page load time: the time it takes for the entire page to load, including style sheets and images.

In some embodiments, when a user clicks in a location in world map 1308, the waterfall at 1312 is updated. The waterfall view 1312 provides a breakdown of the individual performance of each component of the page, for example, including time measurements for each of the following: Blocked: the time the browser is waiting for a TCP connection to be available to process the request; DNS: the time it takes to do a DNS resolution for the name of the resource; Connect: the time it takes to establish a TCP connection to the server; SSL/TSL: the time it takes to do the SSL/TSL handshake; Wait: the time between sending the HTTP request and getting the first byte of the reply back from the server; and Receive: the time it takes from the first byte of the answer until the last byte is received.

Case Studies

Figure 14:
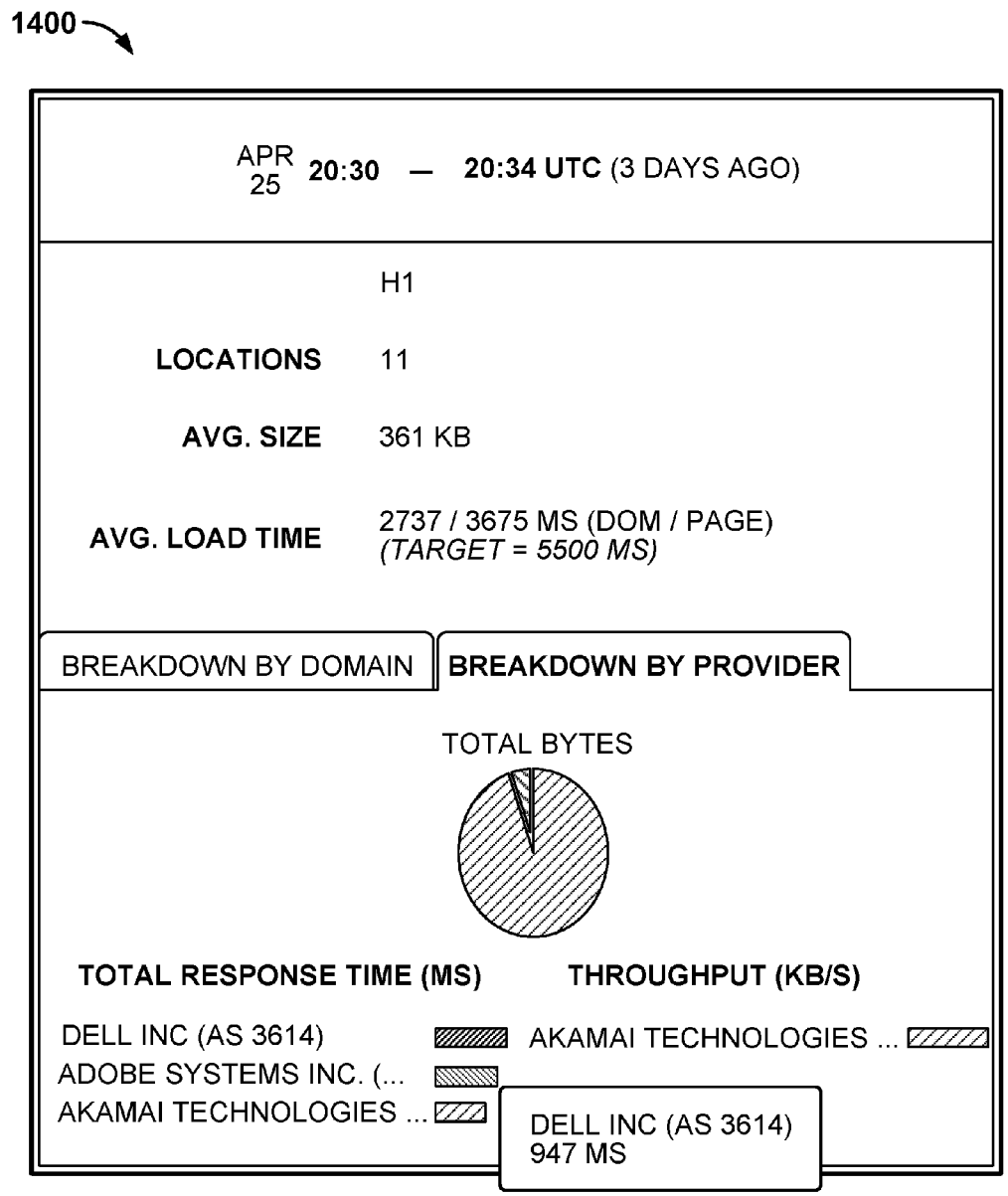
FIG. 14 illustrates a bottleneck analysis by provider for page loads in accordance with some embodiments.

FIG. 14 illustrates a bottleneck analysis by provider for page loads in accordance with some embodiments. In particular, FIG. 14 is a screen shot 1400 of a GUI presented via an interface (e.g., using platform 100) that provides a visualization of a network performance using various techniques described herein.

In particular, FIG. 14 illustrates a page load view that indicates detailed views of page load by provider (e.g., each object can provide from different providers, such as Dell, Adobe, and Akamai for www.example.com), for a particular period of time and an average response time and throughput, using browser measurements (e.g., using web testing agents, as similarly discussed above).

Web Transactions

Figure 15:
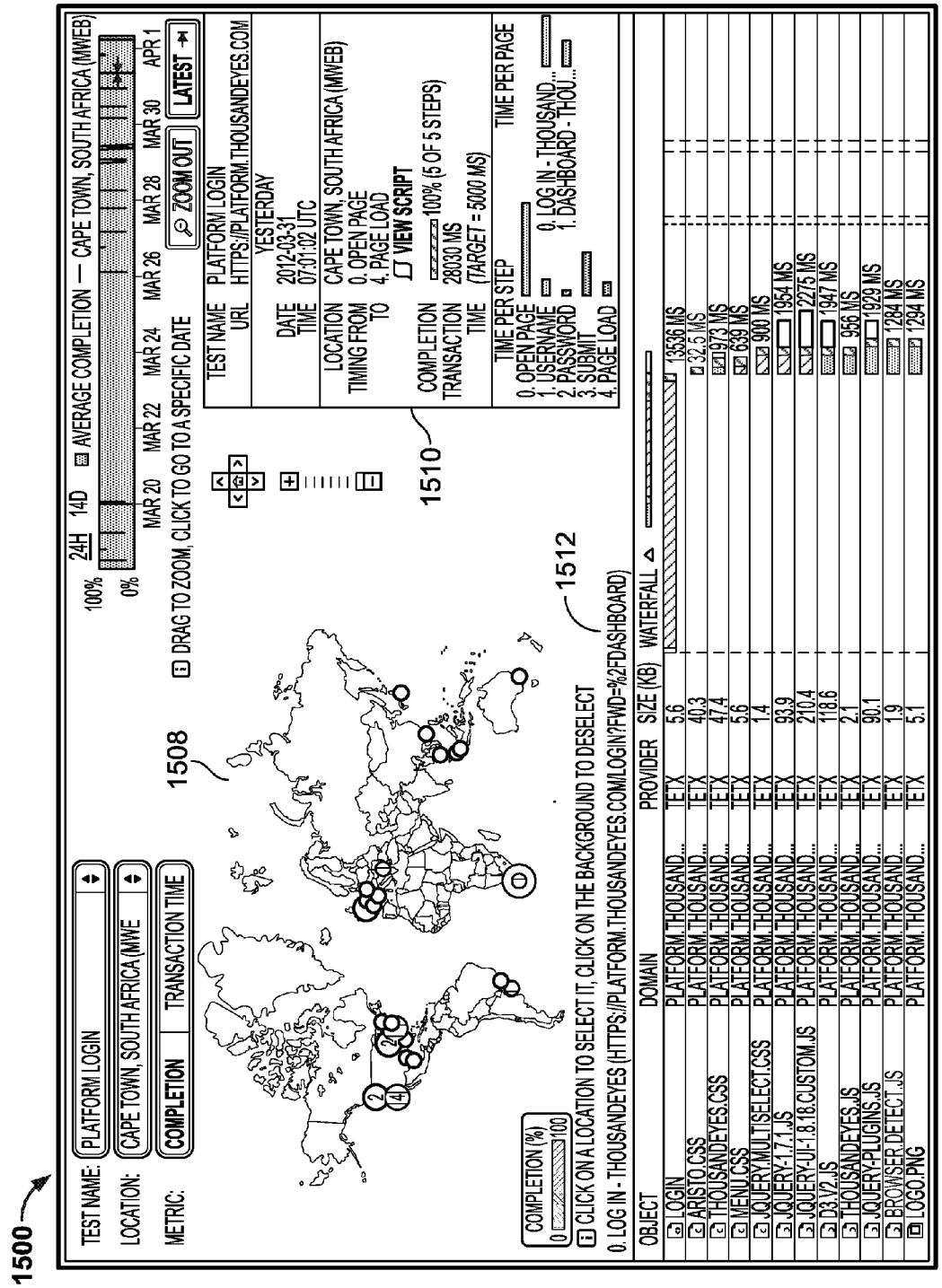
FIG. 15 illustrates a visualization of transactions (e.g., web transactions) in accordance with some embodiments.

FIG. 15 illustrates a visualization of transactions (e.g., web transactions) in accordance with some embodiments. In particular, FIG. 15 is a screen shot 1500 of a GUI presented via an interface (e.g., using platform 100) that provides a visualization of a network performance using various techniques described herein.

In some embodiments, in addition to tests on individual web pages, the platform for cross-layer visibility for application delivery also supports transaction tests, such as for web-based transactions. For example, a transaction can refer to a series of scripted steps that are automatically executed in a browser. As an example, a transaction can include going to a homepage of a web site and adding an item into a shopping cart. As another example, a transaction can include going to a home page of a web site, logging into the web site with user credentials, and downloading a first home login page associated with that user's credentials.

Accordingly, in some embodiments, transactions are used to refer to extensions of single page loads, and, as shown in FIG. 15, the visualization of transactions can similarly be provided as for single page loads (e.g., simple, single web page load transactions). In some embodiments, on each transaction, users are allowed to define an initial step and a final step. For example, these steps can be used to define the boundaries of interest in the transaction and to define the boundaries for computing the transaction time for the measured transaction.

As shown in FIG. 15, in waterfall 1512, all the steps of the transaction are presented as vertical colored lines or using another visual indicator(s) (e.g., the x-offset corresponds to elapsed time since step 0). The individual components that are outside of the interval defined between the initial and final step can be faded out to visually emphasize the relevant steps. In the summary component 1510, a breakdown of the time spent on each step and the time each page loaded during a transaction took to load is provided. For example, metrics for transactions can include: Completion: the fraction of transaction steps that were completed during the transaction; and/or Transaction time: the time between the initial step and the final step of the transaction.

Case Studies

Figure 16:
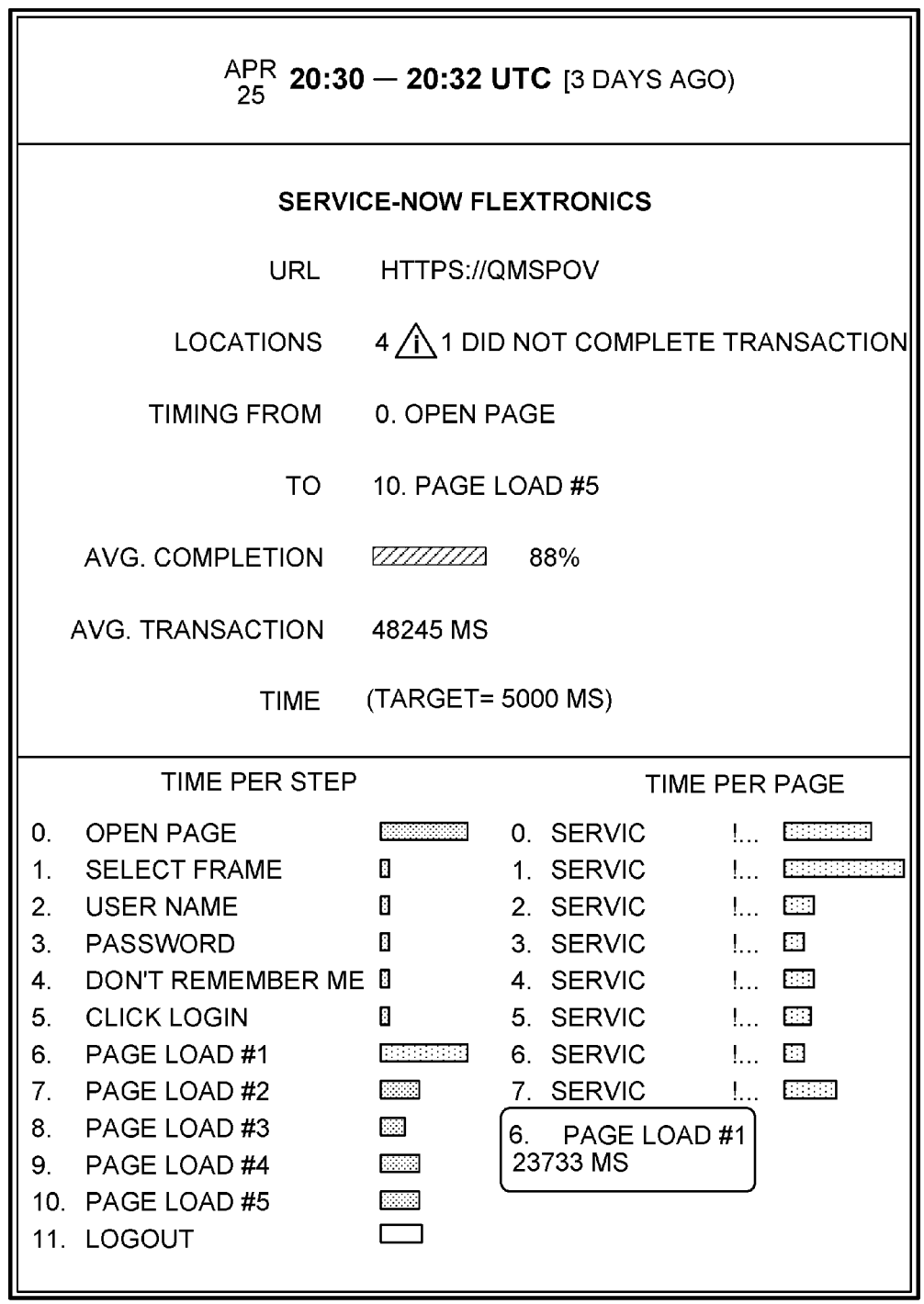
FIG. 16 shows a summary of transaction steps and identifying bottlenecks in accordance with some embodiments.

FIG. 16 shows a summary of transaction steps and identifying bottlenecks in accordance with some embodiments. For example, FIG. 16 illustrates web transaction screen shot 1600 of a summary including a time per step and time per page for an example web transaction test results. In particular, as shown, step 6 for page load #1 was measured as using a relatively significant/longer amount of time. Thus, this indicates that step 6 for page load #1 may be the cause of the bottleneck for these web transactions.

Diagnosing Performance Issues Using Browser Extension

Performance problems can be challenging and time consuming to diagnose when they cannot be reproduced. When users experience performance problems and report to IT or to the service provider, the providers often use data from a nearby city from an external monitoring system to cross check. However, this is problematic, because it does not collect data from the end user reporting the problem.

Accordingly, in some embodiments, a new browser extension is provided (e.g., for a web browser), which is a lightweight extension that can be installed by any users that desire to report their experience to a service provider or Information Technology (IT) department. For example, when the user clicks on a small "capture performance" icon on the browser of the user's client device (e.g., laptop, computer, smart phone, or other computing device that can execute a web browser), the add-on starts recording errors and timings for each object received by the browser, and also perform active measurements such as traceroutes at the same instant of time. The extension then exports the data collected to a collector of a service provider or IT department (e.g., cloud based network performance service provider or IT), which channels the data to the relevant customer of the service provider/IT based on the domain that was being tested. For example, data on a test to store.apple.com can be made available on the Apple users (e.g., in the service provider's data for the customer) if they exist.

Figure 17:
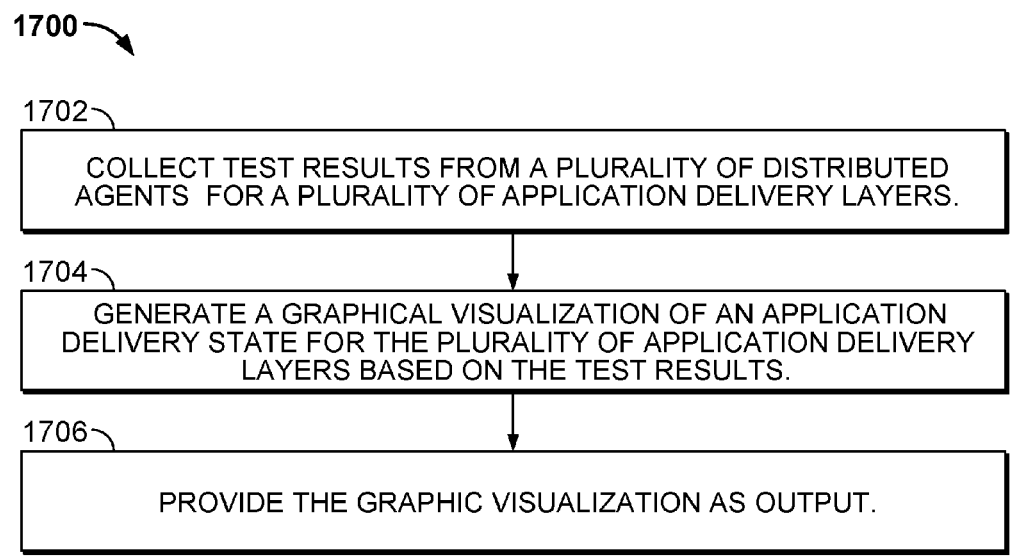
FIG. 17 illustrates a flow diagram for cross-layer troubleshooting of application delivery in accordance with some embodiments.

FIG. 17 illustrates a flow diagram for cross-layer troubleshooting of application delivery in accordance with some embodiments. In some embodiments, process 1700 is performed using platform 100 as shown in FIG. 1. At 1702, collecting test results from a plurality of distributed agents for a plurality of application delivery layers is performed. At 1704, generating a graphical visualization of an application delivery state for the plurality of application delivery layers based on the test results is performed. At 1706, the graphic visualization is output.

Figure 18:
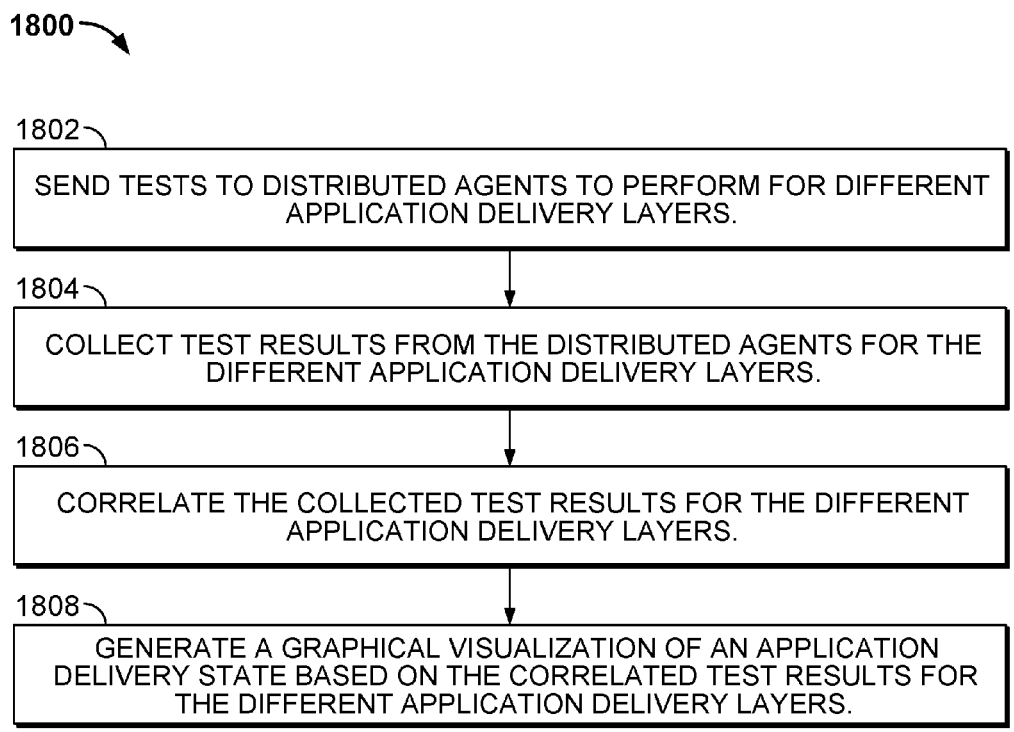
FIG. 18 illustrates another flow diagram for cross-layer troubleshooting of application delivery in accordance with some embodiments.

FIG. 18 illustrates another flow diagram for cross-layer troubleshooting of application delivery in accordance with some embodiments. In some embodiments, process 1800 is performed using platform 100 as shown in FIG. 1. At 1802, sending tests to distributed agents (e.g., application delivery tests) to perform for different application delivery layers (e.g., to perform various active measurements across different application delivery layers) is performed. At 1804, collecting test results from the distributed agents for the different application delivery layers is performed. At 1806, correlating the collected test results for the different application delivery layers is performed. At 1808, generating a graphical visualization based on the correlated test results for the different application delivery layers (e.g., generating a graphical visualization of application delivery results for the different layers and enabling layer correlation) is performed.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  collect test results from a plurality of distributed agents for a plurality of application delivery layers, wherein each of the plurality of distributed agents performs one or more active measurements for identifying an MultiProtocol Label Switching (MPLS) tunnel and identifying a type of the MPLS tunnel; and
  determine whether a link is associated with an implicit MPLS tunnel, wherein the implicit MPLS tunnel is inferred by examining a returned IP Time To Live (TTL) in Internet Control Message Protocol (ICMP) Time Exceeded packets, and in the event that the link is associated with the implicit MPLS tunnel, generate a display output that includes inferred hop information for the link associated with the implicit MPLS tunnel; and
 a memory coupled to the processor and configured to provide the processor with instructions.

2. The system recited in claim 1, wherein the processor is further configured to:
 determine whether the link is associated with an opaque MPLS tunnel, wherein a length of the implicit MPLS tunnel is inferred by examining a quoted Time To Live (TTL) in an MPLS stack, and in the event that the link is associated with the opaque MPLS tunnel, generate a display output that includes inferred hop information for the link associated with the opaque MPLS tunnel.

3. The system recited in claim 1, wherein the processor is further configured to:
 determine that the link is one of a plurality of links associated with the MPLS tunnel.

4. The system recited in claim 1, wherein the processor is further configured to:
 output a graphical visualization of an application delivery state based on the test results, wherein the output includes hop information for the link associated with the MPLS tunnel.

5. The system recited in claim 1, wherein the processor is further configured to:
 determine that the link is associated with the MPLS tunnel, wherein the MPLS tunnel is an explicit MPLS tunnel; and
 generate a display output that includes label information for the link associated with the MPLS tunnel.

6. The system recited in claim 1, wherein the processor is further configured to:
 determine that a plurality of links are associated with the MPLS tunnel, wherein the MPLS tunnel is an explicit MPLS tunnel; and
 generate a display output that includes label information for each of the plurality of links associated with the MPLS tunnel.

7. The system recited in claim 1, wherein the processor is further configured to:
 determine that the link is associated with the MPLS tunnel, wherein the MPLS tunnel is an opaque MPLS tunnel; and
 generate a display output that includes inferred hop information for the link associated with the MPLS tunnel.

8. The system recited in claim 1, wherein the processor is further configured to:
 generate a graphical visualization of an application delivery state for the plurality of application delivery layers based on the test results for cross-layer troubleshooting of application delivery.

9. The system recited in claim 1, wherein the type of the MPLS tunnel is selected from one of the following: an explicit MLS tunnel, an implicit MPLS tunnel, an opaque MPLS tunnel, and an invisible MPLS tunnel, and wherein the processor is further configured to:
 generate a graphical visualization of an application delivery state for the plurality of application delivery layers based on the test results for cross-layer troubleshooting of application delivery, wherein the graphic visualization includes a link that is determined to be associated with an identified explicit MPLS tunnel, an identified implicit MPLS tunnel, an identified opaque MPLS tunnel, or an identified invisible MPLS tunnel.

10. A method, comprising:
 collecting test results from a plurality of distributed agents for a plurality of application delivery layers using, wherein each of the plurality of distributed agents performs one or more active measurements for identifying an MultiProtocol Label Switching (MPLS) tunnel and identifying a type of the MPLS tunnel; and
 determining whether a link is associated with an implicit MPLS tunnel, wherein the implicit MPLS tunnel is inferred by examining a returned IP Time To Live (TTL) in Internet Control Message Protocol (ICMP) Time Exceeded packets, and in the event that the link is associated with the implicit MPLS tunnel, generating a display output that includes inferred hop information for the link associated with the implicit MPLS tunnel.

11. The method of claim 10, further comprising:
 determining whether the link is associated with an opaque MPLS tunnel, wherein a length of the implicit MPLS tunnel is inferred by examining a quoted Time To Live (TTL) in an MPLS stack, and in the event that the link is associated with the opaque MPLS tunnel, generating a display output that includes inferred hop information for the link associated with the opaque MPLS tunnel.

12. The method of claim 10, further comprising:
determining that the link is associated with the MPLS tunnel, wherein the MPLS tunnel is an explicit MPLS tunnel; and
generating a display output that includes label information for the link associated with the MPLS tunnel.

13. The method of claim 10, further comprising:
determining that a plurality of links are associated with the MPLS tunnel, wherein the MPLS tunnel is an explicit MPLS tunnel; and
generating a display output that includes label information for each of the plurality of links associated with the MPLS tunnel.

14. The method of claim 10, further comprising:
determining that the link is associated with the MPLS tunnel, wherein the MPLS tunnel is an opaque MPLS tunnel; and
generating a display output that includes inferred hop information for the link associated with the MPLS tunnel.

15. The method of claim 10, further comprising:
generating a graphical visualization of an application delivery state for the plurality of application delivery layers based on the test results for cross-layer troubleshooting of application delivery.

16. A computer program product, the computer program product comprising a non-transitory tangible computer readable storage medium and comprising computer instructions for:
collecting test results from a plurality of distributed agents for a plurality of application delivery layers, wherein each of the plurality of distributed agents performs one or more active measurements for identifying an MultiProtocol Label Switching (MPLS) tunnel and identifying a type of the MPLS tunnel; and
determining whether a link is associated with an implicit MPLS tunnel, wherein the implicit MPLS tunnel is inferred by examining a returned IP Time To Live (TTL) in Internet Control Message Protocol (ICMP) Time Exceeded packets, and in the event that the link is associated with the implicit MPLS tunnel, generating a display output that includes inferred hop information for the link associated with the implicit MPLS tunnel.

17. The computer program product recited in claim 16, further comprising computer instructions for:
determining whether the link is associated with an opaque MPLS tunnel, wherein a length of the implicit MPLS tunnel is inferred by examining a quoted Time To Live (TTL) in an MPLS stack, and in the event that the link is associated with the opaque MPLS tunnel, generating a display output that includes inferred hop information for the link associated with the opaque MPLS tunnel.

18. The computer program product recited in claim 16, further comprising computer instructions for:
determining that the link is associated with the MPLS tunnel, wherein the MPLS tunnel is an explicit MPLS tunnel; and
generating a display output that includes label information for the link associated with the MPLS tunnel.

19. The computer program product recited in claim 16, further comprising computer instructions for:
determining that a plurality of links are associated with the MPLS tunnel, wherein the MPLS tunnel is an explicit MPLS tunnel; and
generating a display output that includes label information for each of the plurality of links associated with the MPLS tunnel.

20. The computer program product recited in claim 16, further comprising computer instructions for:
determining that the link is associated with the MPLS tunnel, wherein the MPLS tunnel is an opaque MPLS tunnel; and
generating a display output that includes inferred hop information for the link associated with the MPLS tunnel.

21. The computer program product recited in claim 16, further comprising computer instructions for:
generating a graphical visualization of an application delivery state for the plurality of application delivery layers based on the test results for cross-layer troubleshooting of application delivery.

22. A system, comprising:
a processor configured to:
collect test results from a plurality of distributed agents for a plurality of application delivery layers, wherein each of the plurality of distributed agents executes a Path Maximum Transmission Unit (PMTU) discovery process to infer one or more links that show a decrease in Maximum Transmission Unit (MTU); and
determine whether an MTU value is below a threshold MTU value or if the PMTU discovery process failed based on the test results for cross-layer troubleshooting of application delivery; and
a memory coupled to the processor and configured to provide the processor with instructions.

23. The system recited in claim 22, wherein the processor is further configured to:
generate a graphical visualization of an application delivery state for the plurality of application delivery layers based on the test results for cross-layer troubleshooting of application delivery, wherein the graphic visualization includes a visualization of routing paths annotated with MTU data.

24. A system, comprising:
a processor configured to:
collect test results from a plurality of distributed agents for a plurality of application delivery layers, wherein each of the plurality of distributed agents executes TCP-based network tests to measure a TCP Maximum Segment Size (MSS) for a TCP-based network; and
determine whether the measured TCP MSS for the TCP-based network is above a threshold MSS value for cross-layer troubleshooting of application delivery, wherein exceeding the threshold MSS value is associated with IP fragmentation; and
a memory coupled to the processor and configured to provide the processor with instructions.

25. The system recited in claim 24, wherein the processor is further configured to:
generate a graphical visualization of an application delivery state for the plurality of application delivery layers based on the test results for cross-layer troubleshooting of application delivery, wherein the graphic visualization includes a visualization of routing paths annotated with the measured TCP MSS.

26. A method, comprising:
collecting test results from a plurality of distributed agents for a plurality of application delivery layers, wherein each of the plurality of distributed agents executes a Path Maximum Transmission Unit (PMTU) discovery process to infer one or more links that show a decrease in Maximum Transmission Unit (MTU);

determining whether an MTU value is below a threshold MTU value or if the PMTU discovery process failed based on the test results for cross-layer troubleshooting of application delivery; and generating a graphical visualization of an application delivery state for the plurality of application delivery layers based on the test results for cross-layer troubleshooting of application delivery, wherein the graphic visualization includes a visualization of routing paths annotated with MTU data.

27. A computer program product, the computer program product comprising a non-transitory tangible computer readable storage medium and comprising computer instructions for:

collecting test results from a plurality of distributed agents for a plurality of application delivery layers, wherein each of the plurality of distributed agents executes a Path Maximum Transmission Unit (PMTU) discovery process to infer one or more links that show a decrease in Maximum Transmission Unit (MTU);

determining whether an MTU value is below a threshold MTU value or if the PMTU discovery process failed based on the test results for cross-layer troubleshooting of application delivery; and generating a graphical visualization of an application delivery state for the plurality of application delivery layers based on the test results for cross-layer troubleshooting of application delivery, wherein the graphic visualization includes a visualization of routing paths annotated with MTU data.

28. A method, comprising:

collecting test results from a plurality of distributed agents for a plurality of application delivery layers, wherein each of the plurality of distributed agents executes TCP-based network tests to measure a TCP Maximum Segment Size (MSS) for a TCP-based network;

determining whether the measured TCP MSS for the TCP-based network is above a threshold MSS value for cross-layer troubleshooting of application delivery, wherein exceeding the threshold MSS value is associated with IP fragmentation; and generating a graphical visualization of an application delivery state for the plurality of application delivery layers based on the test results for cross-layer troubleshooting of application delivery, wherein the graphic visualization includes a visualization of routing paths annotated with the measured TCP MSS.

29. A computer program product, the computer program product comprising a non-transitory tangible computer readable storage medium and comprising computer instructions for:

collecting test results from a plurality of distributed agents for a plurality of application delivery layers, wherein each of the plurality of distributed agents executes TCP-based network tests to measure a TCP Maximum Segment Size (MSS) for a TCP-based network;

determining whether the measured TCP MSS for the TCP-based network is above a threshold MSS value for cross-layer troubleshooting of application delivery, wherein exceeding the threshold MSS value is associated with IP fragmentation; and generating a graphical visualization of an application delivery state for the plurality of application delivery layers based on the test results for cross-layer troubleshooting of application delivery, wherein the graphic visualization includes a visualization of routing paths annotated with the measured TCP MSS.

* * * * *

UNITED STATES PATENT AND TRADEMARK OFFICE
CERTIFICATE OF CORRECTION

PATENT NO. : 9,800,478 B2
APPLICATION NO. : 15/194398
DATED : October 24, 2017
INVENTOR(S) : Lad et al.

Page 1 of 1

It is certified that error appears in the above-identified patent and that said Letters Patent is hereby corrected as shown below:

In the Specification

Column 1, Line 16, insert -- "This invention was made with government support under IIP-0946179 and IIP-1058602 awarded by the National Science Foundation. The government has certain rights in the invention." --

Signed and Sealed this
Seventh Day of July, 2020

Andrei Iancu
*Director of the United States Patent and Trademark Office*